(12) United States Patent
Chambers et al.

(10) Patent No.: US 12,306,856 B2
(45) Date of Patent: May 20, 2025

(54) METHODS, SYSTEMS, AND DEVICES FOR MAPPING WIRELESS COMMUNICATION SIGNALS FOR MOBILE ROBOT GUIDANCE

(71) Applicant: iRobot Corporation, Bedford, MA (US)

(72) Inventors: Paul Chambers, San Jose, CA (US); Justin H. Kearns, Los Angeles, CA (US); Orjeta Taka, Los Angeles, CA (US); Michael J. Dooley, Pasadena, CA (US); Nikolai Romanov, Oak Park, CA (US); Gary Ellis Hall, Malden, MA (US)

(73) Assignee: iRobot Corporation, Bedford, MA (US)

( * ) Notice: Subject to any disclaimer, the term of this patent is extended or adjusted under 35 U.S.C. 154(b) by 684 days.

(21) Appl. No.: 16/850,263

(22) Filed: Apr. 16, 2020

(65) Prior Publication Data

US 2020/0242136 A1     Jul. 30, 2020

Related U.S. Application Data

(63) Continuation of application No. 15/588,117, filed on May 5, 2017, now Pat. No. 10,664,502.

(51) Int. Cl.
*G06F 16/29*     (2019.01)
*G05D 1/00*      (2006.01)
(Continued)

(52) U.S. Cl.
CPC ......... *G06F 16/29* (2019.01); *G05D 1/0246* (2013.01); *G05D 1/0274* (2013.01);
(Continued)

(58) Field of Classification Search
CPC ........... H04W 4/02; H04W 4/30; H04W 4/33; H04W 4/38; H04W 4/44; H04W 4/70;
(Continued)

(56) References Cited

U.S. PATENT DOCUMENTS 9,307,368 B1 *   4/2016   Bartlett ................ G05D 1/0274
9,411,037 B2     8/2016   Jamtgaard et al.
(Continued)

FOREIGN PATENT DOCUMENTS

CN      1853876      11/2006
CN    104848848       8/2015
(Continued)

OTHER PUBLICATIONS

"European Application Serial No. 18794164.6, Response filed Jun. 15, 2020 to Communication pursuant to Rules 161(2) and 162 EPC mailed Dec. 12, 2019", 18 pgs.
(Continued)

*Primary Examiner* — Russell Frejd
*Assistant Examiner* — Sara J Lewandroski
(74) *Attorney, Agent, or Firm* — Schwegman Lundberg & Woessner, P.A.

(57)     ABSTRACT

A method of operating a computing device includes receiving occupancy data for an operating environment of a mobile robot based on localization data detected by at least one localization sensor of the mobile robot responsive to navigation thereof in the operating environment, and receiving signal coverage data for the operating environment based on wireless communication signals acquired by at least one wireless receiver of the mobile robot responsive to navigation thereof in the operating environment. The wireless communication signals are transmitted by at least one electronic device that is local to the operating environment. The method further includes generating a map indicating (Continued)

coverage patterns of the wireless communication signals at respective locations in the operating environment by correlating the occupancy data and the signal coverage data. Related methods, mobile robots, and user terminals are also discussed.

20 Claims, 16 Drawing Sheets

(51) Int. Cl.
| | |
|---|---|
| G05D 1/02 | (2020.01) |
| G06Q 30/02 | (2023.01) |
| G06Q 30/0251 | (2023.01) |
| H04W 4/70 | (2018.01) |
| H04W 24/08 | (2009.01) |
| H04W 4/02 | (2018.01) |
| H04W 4/33 | (2018.01) |
| H04W 4/80 | (2018.01) |

(52) U.S. Cl.
CPC ....... *G05D 1/0285* (2013.01); *G06Q 30/0261* (2013.01); *H04W 4/70* (2018.02); *H04W 24/08* (2013.01); *H04W 4/02* (2013.01); *H04W 4/33* (2018.02); *H04W 4/80* (2018.02)

(58) Field of Classification Search
CPC ............... G05D 1/0044; G05D 1/0274; G06Q 30/0205; G06Q 30/0241; G06Q 30/0251; G06Q 30/0252; G06Q 30/0261; G06Q 30/0267; G06Q 30/0631; G06Q 20/308; G16Y 30/00; G16Y 40/00; G16Y 40/10; G16Y 40/20; G16Y 40/60; G01C 21/005; G01C 21/38; G01C 21/3804; G01C 21/3807; G01C 21/383; G01C 21/3833; G01C 21/3837; G01C 21/3841; G01C 21/3848; G01S 5/0252; G01S 5/02521; G01S 5/02522; G01S 5/02523; G01S 5/02524; G01S 5/02525; G01S 5/02526
See application file for complete search history.

(56) References Cited

U.S. PATENT DOCUMENTS

| | | | |
|---|---|---|---|
| 9,948,380 B1* | 4/2018 | Vos | H04B 7/18506 |
| 10,145,962 B1 | 12/2018 | Nikkhah et al. | |
| 10,497,472 B1* | 12/2019 | Bullington | H04W 4/029 |
| 10,664,502 B2 | 5/2020 | Chambers et al. | |
| 2006/0238159 A1 | 10/2006 | Jung | |
| 2006/0238169 A1 | 10/2006 | Baker | |
| 2007/0018890 A1 | 1/2007 | Kulyukin | |
| 2007/0298805 A1* | 12/2007 | Basak | H04W 16/18 455/446 |
| 2008/0027591 A1 | 1/2008 | Lenser et al. | |
| 2008/0033645 A1 | 2/2008 | Levinson | |
| 2009/0012667 A1 | 1/2009 | Matsumoto et al. | |
| 2011/0298658 A1 | 12/2011 | Riley et al. | |
| 2012/0188057 A1 | 7/2012 | Green et al. | |
| 2013/0035109 A1* | 2/2013 | Tsruya | G01S 5/0252 455/456.1 |
| 2013/0138246 A1* | 5/2013 | Gutmann | G05D 1/0274 700/253 |
| 2013/0138247 A1 | 5/2013 | Gutmann et al. | |
| 2013/0257657 A1* | 10/2013 | Garin | G09B 29/005 342/451 |
| 2014/0195049 A1* | 7/2014 | Im | G05D 1/0291 700/248 |
| 2014/0207282 A1* | 7/2014 | Angle | G05B 15/02 700/257 |
| 2014/0256346 A1* | 9/2014 | Venkatraman | G01S 5/0252 455/456.1 |
| 2015/0031390 A1 | 1/2015 | Robertson et al. | |
| 2015/0035858 A1 | 2/2015 | Yang et al. | |
| 2015/0045054 A1* | 2/2015 | Emadzadeh | G01S 5/0242 455/456.1 |
| 2015/0092048 A1 | 4/2015 | Brunner et al. | |
| 2015/0094952 A1* | 4/2015 | Moeglein | H04W 4/33 701/491 |
| 2015/0264519 A1* | 9/2015 | Mirzaei | G01S 5/0252 455/457 |
| 2015/0308839 A1 | 10/2015 | Jiang et al. | |
| 2015/0312774 A1* | 10/2015 | Lau | H04W 24/10 455/446 |
| 2015/0347114 A1 | 12/2015 | Yoon | |
| 2016/0061612 A1 | 3/2016 | You et al. | |
| 2016/0069978 A1* | 3/2016 | Rangarajan | G01S 1/08 455/456.1 |
| 2016/0109551 A1 | 4/2016 | Faragher | |
| 2016/0129593 A1 | 5/2016 | Wolowelsky et al. | |
| 2016/0134719 A1* | 5/2016 | Wang | H04L 67/52 715/738 |
| 2016/0139255 A1 | 5/2016 | Bueschenfeld et al. | |
| 2016/0259028 A1 | 9/2016 | High et al. | |
| 2016/0353238 A1 | 12/2016 | Gherardi et al. | |
| 2017/0028564 A1 | 2/2017 | Lowy | |
| 2017/0064491 A1 | 3/2017 | Mirza et al. | |
| 2017/0090007 A1 | 3/2017 | Park et al. | |
| 2017/0225336 A1* | 8/2017 | Deyle | G08B 13/196 |
| 2017/0318422 A1* | 11/2017 | Kokkonen | H04W 4/33 |
| 2018/0050634 A1 | 2/2018 | White et al. | |
| 2018/0106618 A1 | 4/2018 | Cerchio et al. | |
| 2018/0124562 A1* | 5/2018 | White | H04W 4/029 |
| 2018/0173244 A1 | 6/2018 | Yoon et al. | |
| 2018/0252528 A1 | 9/2018 | Zhuang et al. | |
| 2018/0253108 A1 | 9/2018 | Heinla et al. | |
| 2018/0283882 A1 | 10/2018 | He et al. | |
| 2018/0299899 A1* | 10/2018 | Suvarna | A47L 9/2805 |
| 2018/0302838 A1 | 10/2018 | Loussides et al. | |
| 2018/0321687 A1 | 11/2018 | Chambers et al. | |
| 2018/0335502 A1 | 11/2018 | Lowe et al. | |
| 2018/0372854 A1 | 12/2018 | Feil et al. | |
| 2019/0025062 A1* | 1/2019 | Young | G01C 21/206 |
| 2019/0053012 A1* | 2/2019 | Hill | G01S 11/06 |
| 2020/0033463 A1* | 1/2020 | Lee | G01S 5/0252 |
| 2020/0061839 A1* | 2/2020 | Deyle | B25J 9/1664 |
| 2020/0217666 A1* | 7/2020 | Zhang | G01S 5/0252 |
| 2021/0352242 A1* | 11/2021 | Mcardle | H04L 65/1083 |

FOREIGN PATENT DOCUMENTS

| | | |
|---|---|---|
| CN | 105158732 | 12/2015 |
| CN | 105563451 | 5/2016 |
| CN | 205969124 | 2/2017 |
| CN | 110769986 | 2/2020 |
| JP | 2005086262 | 3/2005 |
| JP | 2013238599 | 11/2013 |
| JP | 2014021070 | 2/2014 |
| WO | 2017021049 | 2/2017 |
| WO | 2018204019 | 11/2018 |

OTHER PUBLICATIONS

U.S. Appl. No. 15/588,117, U.S. Pat. No. 10,664,502, filed May 5, 2017, Methods, Systems, and Devices for Mapping Wireless Communication Signals for Mobile Robot Guidance.
U.S. Appl. No. 15/588,117, filed May 5, 2017, Methods, Systems, and Devices for Mapping Wireless Communication Signals for Mobile Robot Guidance.
"European Application Serial No. 18794164.6, Partial Supplementary European Search Report mailed Dec. 4, 2020", 13 pgs.
"Chinese Application Serial No. 201880040719.4, Office Action mailed Sep. 21, 2020", w English Translation, 12 pgs.
"European Application Serial No. 18794164.6, Response filed Jul. 29, 2021 to Communication Pursuant to Article 94(3) EPC mailed Mar. 23, 2021", 21 pgs.
"Japanese Application Serial No. 2019-560732, Response filed Aug. 26, 2021 to Notification of Reasons for Refusal mailed Jun. 14, 2021", w English Claims, 13 pgs.

(56) References Cited

OTHER PUBLICATIONS

"Chinese Application Serial No. 201880040719.4, Voluntary Amendment filed Aug. 7, 2020", w English claims, was filed with PPH request, 9 pgs.
"Chinese Application Serial No. 201880040719.4, Response filed Sep. 13, 2021 to Office Action mailed Sep. 9, 2021", w English Claims, 49 pgs.
"Chinese Application Serial No. 201880040719.4, Response filed Jul. 29, 2021 to Office Action mailed May 25, 2021", w English Claims, 54 pgs.
"Chinese Application Serial No. 201880040719.4, Office Action mailed May 25, 2021", w English Translation, 12 pgs.
"Japanese Application Serial No. 2019-560732, Notification of Reasons for Refusal mailed Jun. 14, 2021", w English Translation, 7 pgs.
"European Application Serial No. 18794164.6, Extended European Search Report mailed Mar. 10, 2021", 6 pgs.
"European Application Serial No. 18794164.6, Communication Pursuant to Article 94(3) EPC mailed Mar. 23, 2021", 7 pgs.
"Chinese Application Serial No. 201880040719.4, Response filed Feb. 7, 2021 to Office Action mailed Sep. 21, 2020", w English Claims, 52 pgs.
"U.S. Appl. No. 15/588,117, Non Final Office Action mailed Mar. 19, 2019", 25 pgs.
"U.S. Appl. No. 15/588,117, Preliminary Amendment filed May 5, 2017", 8 pgs.
"International Application Serial No. PCT US2018 026477, International Search Report mailed Jul. 10, 2018", 4 pgs.
"International Application Serial No. PCT US2018 026477, Written Opinion mailed Jul. 10, 2018", 19 pgs.
"U.S. Appl. No. 15/588,117, Response filed Jun. 18, 2019 to Non Final Office Action mailed Mar. 19, 2019", 6 pgs.
"U.S. Appl. No. 15/588,117, Examiner Interview Summary mailed Jun. 19, 2019", 3 pgs.
"U.S. Appl. No. 15/588,117, Final Office Action mailed Sep. 17, 2019", 31 pgs.
"U.S. Appl. No. 15/588,117, Response filed Oct. 17, 2019 to Final Office Action mailed Sep. 17, 2019", 16 pgs.
"U.S. Appl. No. 15/588,117, Examiner Interview Summary mailed Oct. 23, 2019", 3 pgs.
"U.S. Appl. No. 15/588,117, Advisory Action mailed Oct. 25, 2019", 3 pgs.
"International Application Serial No. PCT US2018 026477, International Preliminary Report on Patentability mailed Nov. 14, 2019", 21 pgs.
"U.S. Appl. No. 15/588,117, Notice of Allowance mailed Jan. 17, 2020", 13 pgs.
"U.S. Appl. No. 15/588,117, 312 Amendment filed Feb. 24, 2020", 13 pgs.
"U.S. Appl. No. 15/588,117, Corrected Notice of Allowability mailed Mar. 11, 2020", 8 pgs.
"European Application Serial No. 18794164.6, Communication Pursuant to Article 94(3) EPC mailed Dec. 8, 2021", 8 pgs.
Berkvens, Rafael, et al., "Biologically inspired SLAM using Wi-Fi", 2014 IEEE/RSJ International Conference On Intelligent Robots and Systems, IEEE, [retrieved on Oct. 31, 2014], (Sep. 14, 2014), 1804-1811.
Ito, Seigo, et al., "W-RGB-D: Floor-plan-based indoor global localization using a depth camera and WiFi", 2014 IEEE International Conference on Robotics & Automation (ICRA), IEEE, (May 31, 2014), 417-422.

\* cited by examiner

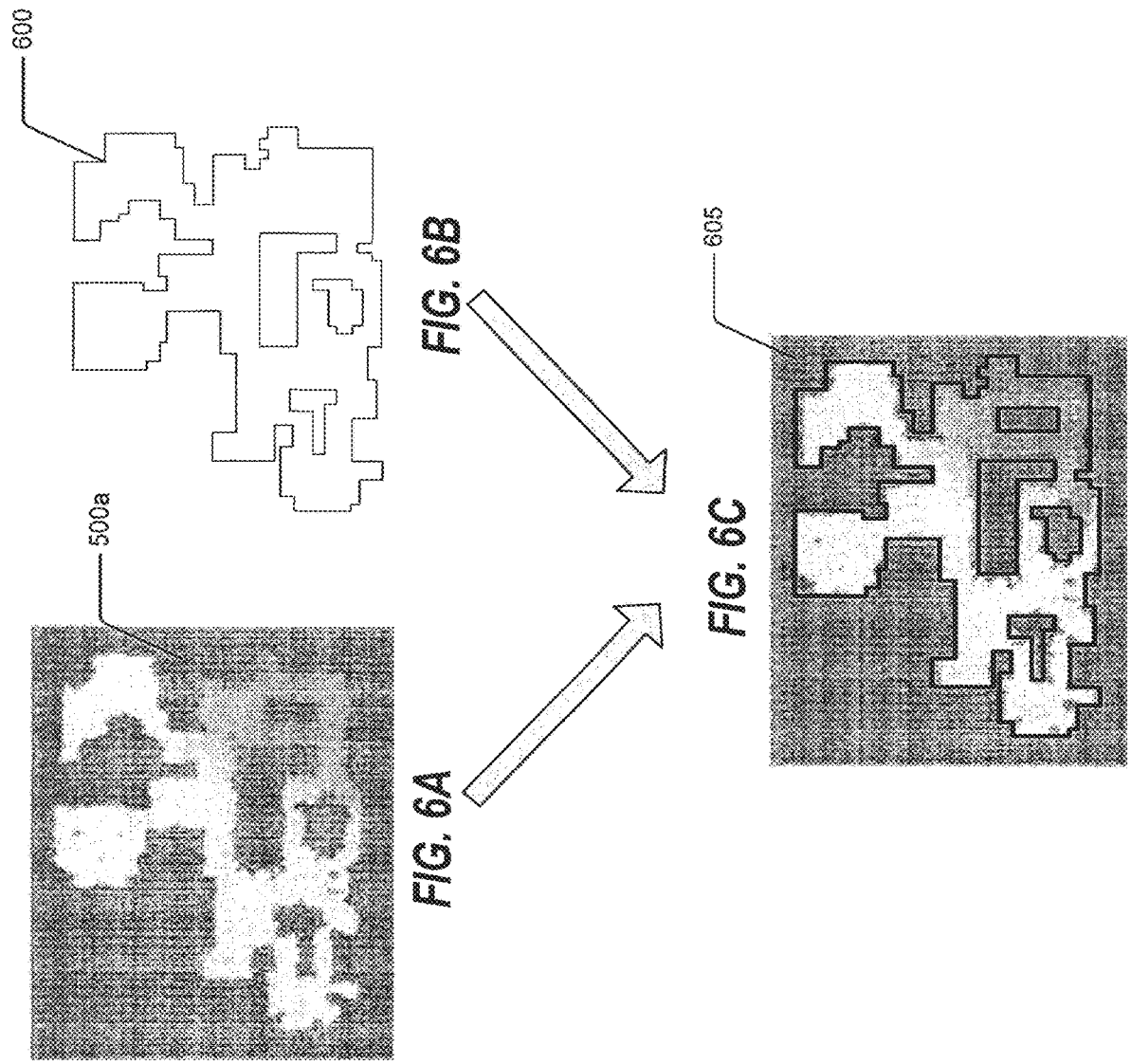

METHODS, SYSTEMS, AND DEVICES FOR MAPPING WIRELESS COMMUNICATION SIGNALS FOR MOBILE ROBOT GUIDANCE

FIELD

The present disclosure relates to mobile robots and systems and methods including the same.

BACKGROUND

Connectivity (including wireless connection to the Internet and remote clients) has been contemplated for household appliances for some time. The term "Internet of Things" (IoT) has come to represent the idea that household articles of all kinds can be connected to the public Internet. Once connected, such articles can report various data to server and client devices. For example, 'smart' light bulbs may be connected to a household WLAN (Wireless Local Area Network). Each light bulb may have a microprocessor, memory, some means of detecting or interpreting status, power, and a wireless connection. Using these components, the light bulb can report its status, can be polled, etc.

The concept of IoT may be considered distinct from household connectivity in general (for example, connected computers, cable boxes, media devices, and the like) in that the IoT devices may not typically include sufficient computing resources or communications to meaningfully connect to the public internet. A conventional refrigerator would not connect to the internet; the same device as an IoT device would include computational, sensor, and communications hardware and sufficient software to become an entity addressable remotely and locally; the expectation being that this Internet Fridge could report its various states (power consumption or the like) and respond to remote commands (increase or decrease internal temperature).

Household mobile robots may also become IoT devices. In some ways, household mobile robots may be considered a distinct species within this set. In particular, the autonomy of the household mobile robot may set it apart from other appliances, which do not perform in unpredictable and variable environment conditions or make autonomous decisions based on tens or hundreds of sensor inputs in order to achieve mission completion. For example, a dishwasher—even an IoT dishwasher—does not know anything about its contents and runs the equivalent of simple scripts controlling motors and pumps, potentially interrupted by simple clog or other sensors. In contrast, a vacuuming robot (such as an iRobot® Roomba® robot) may detect its own state in numerous ways during the course of its mission, and may flexibly escape from challenging situations in the household, as well as engage in predictive and planning activities. As such, there may be challenges in integrating the autonomous behavior of a household mobile robot with IoT connectivity.

SUMMARY

According to some embodiments of the present disclosure, a method of operating a computing device includes performing operations by a processor of the computing device. The operations include receiving occupancy data for an operating environment of a mobile robot based on localization data detected by at least one localization sensor of the mobile robot responsive to navigation thereof in the operating environment, and receiving signal coverage data for the operating environment based on wireless communication signals acquired by at least one wireless receiver of the mobile robot responsive to navigation thereof in the operating environment. The wireless communication signals are transmitted by at least one electronic device that is local to the operating environment. The operations further include generating a map indicating coverage patterns of the wireless communication signals at respective locations in the operating environment by correlating the occupancy data and the signal coverage data.

In some embodiments, the coverage patterns may indicate respective signal strengths of the wireless communication signals at the respective locations in the operating environment. The operations may further include determining a location of the at least one electronic device in the operating environment based on the coverage patterns.

In some embodiments, the operations may further include identifying a type, manufacturer, and/or model of the at least one electronic device based on addressing and/or network services information indicated by the signal coverage data.

In some embodiments, the at least one localization sensor may be a visual localization sensor. The operations may further include determining a placement of the at least one mobile device at the location thereof, based on the type, manufacturer, and/or model thereof, and correlating the placement and the location with an image of at least one mobile device in the localization data.

In some embodiments, the localization data may include visual localization data detected by at least one camera at different times of day and/or in different lighting conditions, and generating the map may include merging respective occupancy maps generated from the visual localization data detected at the different times of day and/or in the different lighting conditions using the location of the at least one electronic device as an anchor point.

In some embodiments, the wireless communication signals may be acquired over a predetermined duration of time such that the map comprises a persistent data structure representing a collection of the respective signal strengths at the respective locations in the operating environment.

In some embodiments, the wireless communication signals may be acquired by the at least one wireless receiver of the mobile robot responsive to monitoring one or more communication channels and/or one or more communication protocols.

In some embodiments, the at least one electronic device may be a first electronic device, and the operations may further include transmitting the map to a second electronic device in the operating environment.

In some embodiments, the mobile robot may be a first mobile robot in the operating environment, the second electronic device may be a second mobile robot in the operating environment, and the second mobile robot may lack a visual localization sensor.

In some embodiments, the operations may further include storing the map as one of a plurality of maps in a non-transitory memory of the computing device, and identifying the maps as corresponding to respective floors at different elevations of the operating environment based on asymmetries in the respective coverage patterns indicated thereby.

According to some embodiments, a method of operating a mobile robot includes performing operations by a processor of the mobile robot. The operations include operating a drive to navigate the mobile robot in an operating environment, and detecting, via at least one localization sensor of the mobile robot, localization data responsive to operating the drive to navigate the mobile robot in the operating environment. The operations further include acquiring, via at least one wireless receiver of the mobile robot, wireless communication signals responsive to operating the drive to navigate the mobile robot in the operating environment, where the wireless communication signals are transmitted by at least one electronic device that is local to the operating environment, and determining a location of the mobile robot in the operating environment based on correlation of the localization data detected by the at least one localization sensor and the wireless communication signals acquired by the at least one wireless receiver.

In some embodiments, the operations may further include detecting a repositioning of the mobile robot in the operating environment. The repositioning may be independent of and subsequent to operating the drive. Determining the location of the mobile robot may include comparing respective signal strengths of the wireless communication signals acquired responsive to the repositioning with respective signal strengths of the wireless communication signals acquired responsive to operating the drive.

In some embodiments, the operations may further include determining a location of the at least one electronic device in the operating environment based on respective signal strengths of the wireless communication signals acquired by the at least one wireless receiver at respective locations in the operating environment, and determining the location of the mobile robot may be relative to the location of the at least one electronic device in the operating environment.

In some embodiments, the at least one localization sensor may be a camera, and the localization data may be visual localization data detected by the camera at different times of day and/or under different lighting conditions. The operations may further include merging respective occupancy maps generated from the visual localization data detected at the different times of day and/or in the different lighting conditions using the location of the at least one electronic device as an anchor point.

In some embodiments, the operations may further include operating the drive to navigate the mobile robot to the location of the at least one electronic device in the operating environment responsive to activation of a sensor associated therewith, capturing, via the at least one localization sensor, audio and/or visual information at the location of the at least one electronic device responsive to operating the drive to navigate the mobile robot thereto, and transmitting, via a wireless transmitter of the mobile robot, the audio and/or visual information to a remote device.

In some embodiments, the at least one electronic device may be first and second devices/The operations may further include identifying that the first and second devices are beyond wireless communication range of each other based on respective signal strengths of the wireless communication signals acquired therefrom via the at least one wireless receiver responsive to operating the drive, and transmitting, via a wireless transmitter of the mobile robot, information detected about one of the first and second devices to another of the first and second devices.

In some embodiments, the information may indicate interfering communications of the first and second devices based on the wireless communication signals acquired therefrom. The operations may further include transmitting, via a wireless transmitter of the mobile robot, an instruction to at least one of the first and second devices to alter a communication channel thereof.

In some embodiments, the at least one wireless receiver may be mounted on or coupled to a telescoping mast or other higher vantage point of the mobile robot, and acquiring the wireless communication signals may be responsive to operating the telescoping mast or other higher vantage point to vary a height of the at least one wireless receiver at respective locations in the operating environment.

In some embodiments, the at least one electronic device may be first and second devices. The operations may further include monitoring, via the wireless receiver, a plurality of communication protocols, and identifying that the first and second devices are configured to communicate using different communication protocols based on the wireless communication signals acquired therefrom via the at least one wireless receiver responsive the monitoring. The operations may further include transmitting, via a wireless transmitter of the mobile robot, information detected about one of the first and second devices to another of the first and second devices via the respective one of the different communication protocols.

According to some embodiments, a mobile robot includes a drive configured to navigate the mobile robot in an operating environment, at least one localization sensor, at least one wireless receiver, a processor coupled to the drive, the at least one localization sensor, and the at least one wireless receiver, and a memory coupled to the processor. The memory includes a non-transitory computer-readable storage medium storing computer-readable program code therein that is executable by the processor to perform operations, which include operating the drive to navigate the mobile robot in the operating environment, and detecting, via the at least one localization sensor of the mobile robot, localization data for the operating environment responsive to operating the drive. The operations further include acquiring, via the at least one wireless receiver of the mobile robot, wireless communication signals responsive to operating the drive, where the wireless communication signals are transmitted by at least one electronic device that is local to the operating environment, and determining a location of the mobile robot in the operating environment based on correlation of the localization data detected by the at least one localization sensor and the wireless communication signals acquired by the at least one wireless receiver.

According to some embodiments, a method of operating user terminal includes performing operations by a processor of the user terminal. The operations include receiving, via a receiver of the user terminal, map information that is based on correlation of localization data detected by a localization sensor of at least one mobile robot in an operating environment thereof and wireless communication signals acquired by a wireless receiver of the at least one mobile robot in the operating environment responsive to navigation of the at least one mobile robot in the operating environment. The wireless communication signals are transmitted by at least one electronic device that is local to the operating environment. The operations further include displaying, via a user interface of the user terminal, one or more visual representations of the map information.

In some embodiments, the one or more visual representations may include an occupancy map indicating physical characteristics of the operating environment including obstacles detected by the localization sensor of the at least one mobile robot in the operating environment, and/or a signal coverage map indicating electrical characteristics of the operating environment including respective signal strengths of the wireless communication signals acquired by the wireless receiver of the at least one mobile robot at respective locations in the operating environment.

In some embodiments, the signal coverage map may be a 2-dimensional representation indicating the respective signal strengths of the wireless communication signals by colors and/or brightness levels that vary at the respective locations in the operating environment, and/or a 3-dimensional topological representation indicating the respective signal strengths of the wireless communication signals at the respective locations in the operating environment relative to an axis and changes in slope of the respective signal strengths between the respective locations.

In some embodiments, the occupancy map may further indicate a location of the at least one electronic device in the operating environment.

In some embodiments, the occupancy map may further indicate the location of the at least one electronic device with a graphical representation of a signal emitted therefrom.

In some embodiments, the operations may further include receiving an indication of a current location of the at least one mobile robot in the operating environment. The graphical representation of the signal may be varied based on a proximity of the current location of the mobile robot to the location of the at least one electronic device.

In some embodiments, the graphical representation may be varied in color, brightness level, and/or distance between displayed bands or rings.

In some embodiments, the occupancy map may further indicate an identity including a type, manufacturer, and/or model of the at least one electronic device.

In some embodiments, the occupancy map may further identify the at east one electronic device as mobile or stationary.

In some embodiments, the operations may further include displaying, via the user interface of the user terminal, an indication of one or more suggested positions in the operating environment for repositioning of the at least one electronic device, based on the wireless communication signals acquired by the wireless receiver of the at least one mobile robot.

In some embodiments, the operations may further include displaying, via the user interface of the user terminal, an indication of one or more suggested frequencies or channels for communication by the at least one electronic device, based on signal interference indicated by the wireless communication signals acquired by the wireless receiver of the at least one mobile robot.

In some embodiments, the location of the at least one electronic device in the operating environment may be a most recent location from which the wireless communication signals were received from the at least one electronic device, and the operations may further include providing, via the user interface of the user terminal, an audio and/or visual indication of the most recent location.

In some embodiments, the one or more visual representations of the map information may indicate areas in the operating environment in which signal coverage by the wireless communication signals is weak or absent, and the operations may further include displaying, via the user interface, a suggestion for improvement of the signal coverage.

In some embodiments, the at least one electronic device may be a wireless router device, and the suggestion may be an incentive for purchase of a new wireless router device.

According to some embodiments, a user terminal includes a receiver, a user interface, a processor coupled to the receiver and the user interface, and a memory coupled to the processor. The memory includes a non-transitory computer-readable storage medium storing computer-readable program code therein that is executable by the processor to perform operations, which includes receiving, via the receiver of the user terminal, map information that is based on correlation of localization data detected by a localization sensor of at least one mobile robot in an operating environment thereof and wireless communication signals acquired by a wireless receiver of the at least one mobile robot in the operating environment responsive to navigation of the at least one mobile robot in the operating environment. The operations further include displaying, via the user interface of the user terminal, one or more visual representations of the map information.

According to some embodiments, a method of operating user terminal includes performing operations by a processor of the user terminal. The operations include receiving, via a receiver of the user terminal, information indicating an absence of wireless router signal coverage in respective locations of an operating environment of a mobile robot based on wireless communication signals acquired by a wireless receiver of the mobile robot responsive to navigation in the operating environment. The operations further include displaying, via a user interface of the user terminal, an incentive for purchase of a wireless router device based on the information indicating the absence of the wireless router signal coverage.

Further features, advantages and details of the present disclosure, including any and all combinations of the above embodiments, will be appreciated by those of ordinary skill in the art from a reading of the figures and the detailed description of the embodiments that follow, such description being merely illustrative of the present disclosure.

BRIEF DESCRIPTION OF THE DRAWINGS

FIGS. 6A, 6B, and 6C are graphs illustrating correlation of signal coverage data and occupancy data obtained by a mobile robot according to embodiments of the present disclosure in an operating environment.

DETAILED DESCRIPTION OF EMBODIMENTS

Figure 1A:
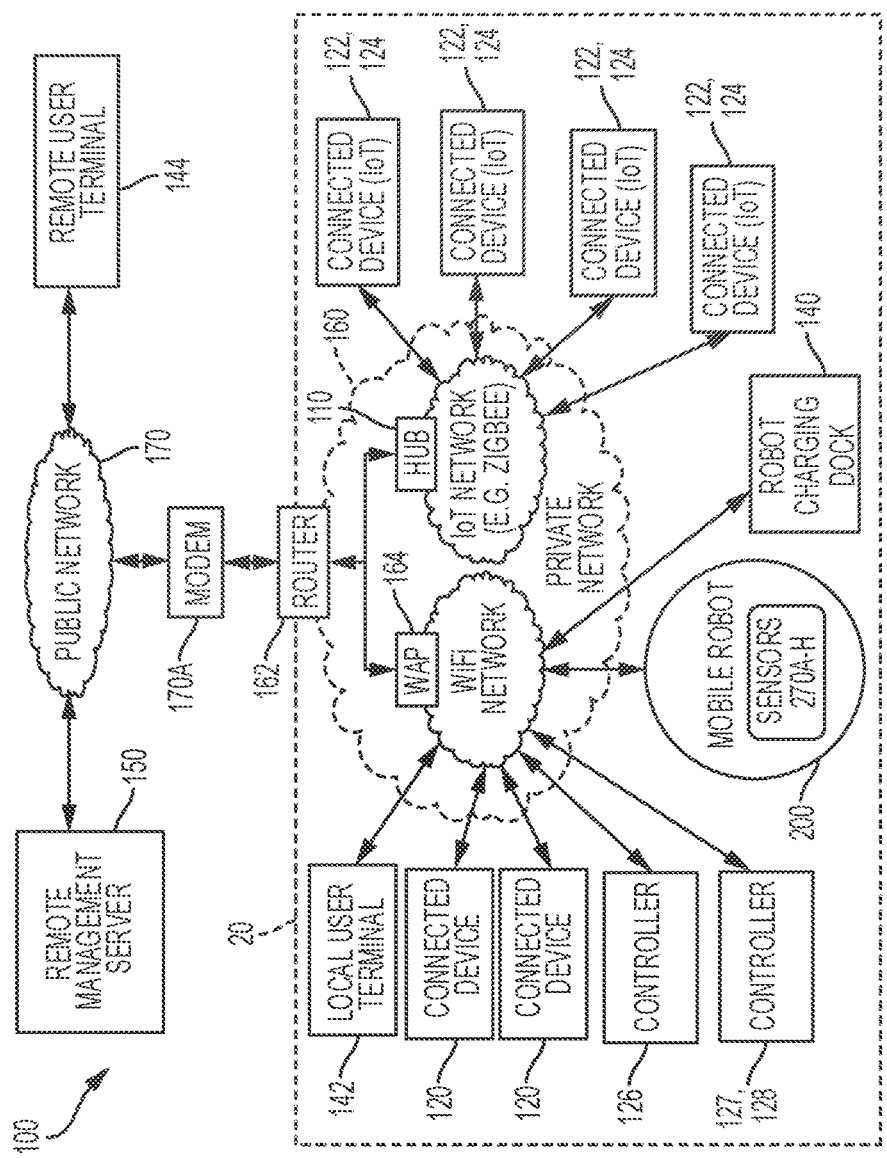
FIG. 1A is a schematic diagram representing a system according to embodiments of the present disclosure.

Embodiments of the present disclosure may arise from realization that the autonomous functionality of a mobile robot may present unique advantages for integration with IoT connectivity based on its independent localization capabilities. In particular, while navigating an operating environment (for example, in performing a cleaning mission or a patrolling mission in a household operating environment), the mobile robot may be configured to simultaneously, intermittently, or subsequently acquire wireless communication signal coverage data throughout one or more areas of the operating environment. For example, the mobile robot may be configured to acquire multiple samples or readings of wireless communication signals that are transmitted by multiple electronic devices, such as IoT-enabled devices, and perform temporal and geographical averaging of the acquired wireless communication signals (for example, based on received signal strength) to construct a 2-dimensional or 3-dimensional representation of the wireless communication signals (such as an RSSI field map, which may be represented as a topological map) for each individual electronic device from which wireless communication signals are received throughout the operating environment. Such a signal coverage map may be free of distortions that may affect magnetically-based navigation.

In some embodiments, the wireless communication signal readings taken at a plurality of 2-dimensional locations along a floor surface of the operating environment may be used to populate a 2-dimensional map of wireless communication signal strengths at respective locations within the household. The 2-dimensional map may be stored in a non-transitory computer-readable memory that is accessible to network entities, and may be displayed on a human-machine interface device in communication with the mobile robot via the network. Such human-machine interface devices include, but are not limited to, a mobile handset smartphone, personal computer, smartwatch, mobile tablet, having a display and/or touchscreen as well as a wireless network interface, processor, and memory.

In some embodiments, wireless communication signal readings taken at a plurality of 2-dimensional locations within the household may be used to populate a 3-dimensional map of wireless communication signal strengths at respective locations within the household. For example, the 3-dimensional map may be a topological map, with the x- and y-axes corresponding to the floorplan of the operating environment and the z-axis corresponding to the signal strength, and changes in slope in the z-direction (including the rate of change and the direction of change) may provide a unique 'signature' for respective locations in the x- and y-directions. The wireless communication signal readings may be used for multiple purposes. For example, the wireless communication signal readings may be used internally by the mobile robot (for example, to improve localization), may be shared with one or more other electronic devices (for example, to improve respective device functionalities), and/or may be shared with a user terminal (for example, to improve network functionality).

A "mobile robot" may refer to any device including a processor, memory, and drive system for navigating variable environment conditions and making autonomous decisions based on a plurality of sensor inputs. Mobile robots as described herein, may include robot cleaners (such as iRobot® ROOMBA®, BRAAVA®, and/or BRAAVA Jet™ cleaners), as well as autonomous patrolling robots. Some such autonomous patrolling robots may include a telescoping mast having one or more sensor elements mounted thereon or otherwise operably associated therewith.

A "wireless communication signal" may refer to any signal transmitted by a network-enabled electronic device (also referred to as a "connected device"). Such electronic devices may include a processor, memory, and a wireless transmitter and/or receiver for communication via a wireless personal, local, and/or wide area network, and may include, but are not limited to, IoT devices. The wireless communication signals may include radio frequency signals, including but not limited to Wi-Fi signals, Bluetooth signals, ZigBee signals, and/or Z-wave signals, and/or optical signals. Such electronic devices may or may not include sufficient computing resources or communications to meaningfully connect to the public internet.

With reference to FIGS. 1A, 1B, and 2-4, a system 100 according to embodiments of the present disclosure is installed in an associated living structure 10. The structure 10 may be a home or residential dwelling, including but not limited to a single-family home, a multi-family dwelling (for example, a unit of a duplex, apartment, condominium, etc.), a mobile home, or a commercial living space (for example, an office or studio). The structure 10 may define a living space 20, or interior space, which may be subdivided (physically, spatially and/or functionally) into one or more defined zones (illustrated as zones A-C) and, in some embodiments, the zones may correspond to rooms in the living structure 10, such as Zone A being a kitchen, Zone B being a living room and Zone C being a bedroom. The defined zones A-C may be divided by walls or may be open concept areas that blend together without a wall division. The structure 10 has windows 30, a door 32, light fixtures 34 (having exhaustible lamps 34A), a TV 36 (or other electronic equipment), and a heating, ventilation and air conditioning system (HVAC) 40. A person P may occupy the living space 20.

Figure 1B:
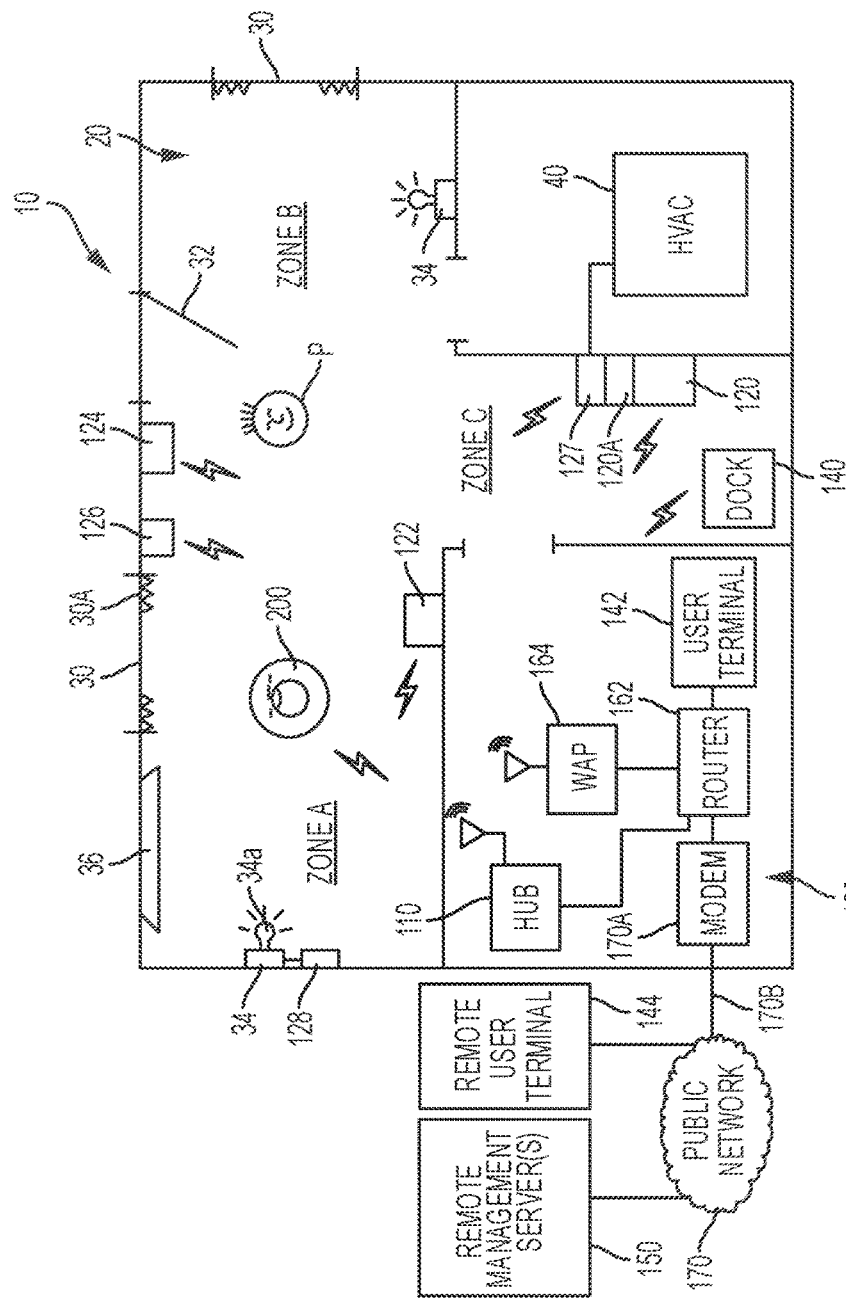
FIG. 1B is a schematic diagram illustrating an operating environment including the system of FIG. 1A installed therein according to embodiments of the present disclosure.

With reference to FIGS. 1A and 1B, the system 100 includes nodes including a network-enabled mobile robot 200, one or more wireless access points (WAP) 164, gateways and/or hubs 110 that interconnect different networking methods to make a local area private network 160, which interconnects network-enabled or "connected" electronic devices (including IoT devices) 120, 122, 124, network-enabled automation controller devices 126, 127, 128, a robot dock 140 that may also be a network-enabled automation controller device, and products that may combine multiple such functions. The private network 160 includes one or more wireless access points (WAP) 164, gateways, or hubs 110 that have a combined wireless range to adequately cover at or around all or most of the living space 20 bounded by the living structure 10. Networked devices connected to the private network 160 can communicate with a remote management service 150 through a router/firewall 162 to reach a public network 170, through a WAN interface 170A and its associated WAN connection 170B. For example, the remote management service 150 may be a cloud computing device, the public network 170 may be the Internet, the WAN interface 170A may be a DSL, DOCSIS or Cellular modem, and its associated WAN connection 170B may be provided by an Internet Service Provider (ISP). The router 162, the WAP 164 and/or the modem 170A may be integrated into a single device, in various configurations. A local user terminal 142, 400 may be connected (wired or wirelessly) to the private network 160. For example, the local user terminal 142, 400 may be a PC, smartphone, or tablet computer. A remote user terminal 144, 400 may be connected to the remote server 150 and/or the private network 160 via the public network 170. The hub 110, the robot 200, the local user terminal 142, 400 and the remote user terminal 144, 400 may each be accessed either through a common network service embodied in a target device (for example, a web server which presents a UI over the local network through a web browser on the client device) or via a specialized client (for example, a downloadable or pre-installed application software app) enabling communications and control between the nodes 110, 200, 140, 142, 144, 400 and 150 as described herein. A network entity as discussed herein is a machine and/or controller that registers on a network, is assigned a unique address for sending and receiving communication signals, and may be available to other network entity machines and/or controllers on the same network or a connected network.

In some embodiments, the "same network" may refer to a set of private addresses on a private IP (Internet Protocol) subnet behind a routing network entity 162 that provides Network Address Translation (NAT) between the public internet and the private network. Each network entity connected to the private network can deduce the network addresses of other active network entities either by observing their network communications, and/or scanning the possible IP subnet of the private network, looking for responses. Some gateways/hubs provide a network service that can enumerate what devices are associated with, and/or reachable through, that gateway/hub. These techniques yield one or both the IP address of each active device and/or their MAC (media access control) address. The Address Resolution Protocol (ARP) network service can map one type of address into the other. In some embodiments, a routine running on the processor of a network entity (such as the mobile robot 200) can collect the network address of another network entity (such as a connected device 120, 122, 124, 126, 127, 128) and identify a type, manufacturer, and/or model, of that network entity, which may be correlated to a physical location in the living structure 10, as discussed in greater detail herein.

The robot dock 140 may include or be connected to a power supply and include a charger operative to charge a battery of the mobile robot 200 when the mobile robot 200 is effectively docked at the robot dock 140. The dock 140 may be an evacuation station including a motorized receptacle actuatable to empty debris from the robot 200. In some embodiments, the dock 140 is connected (wired or wirelessly) to the private network 160 to enable or facilitate transmission of data from the robot 200 to the private network 160 and/or from the private network 160 to the mobile robot 200. The robot dock 140 may thus be considered as an automation controller device. In some embodiments, the robot dock 140 communicates directly with the mobile robot 200 through wireless means, including but not limited to Bluetooth, nearfield induction, IR and/or radio communication signals. Each connected device 120, 122, 124, 126, 127, 128, 140 may include a wireless transceiver (such as a Wi-Fi transceiver) to communicate with the hub 110 and/or private network 160 via the WAP 164. While particular connected devices 120, 122, 124, 126, 127, 128, 140 are shown, more or fewer connected devices may be included in the operating environment 10 and may be in communication with the private network 160.

Figure 2A:
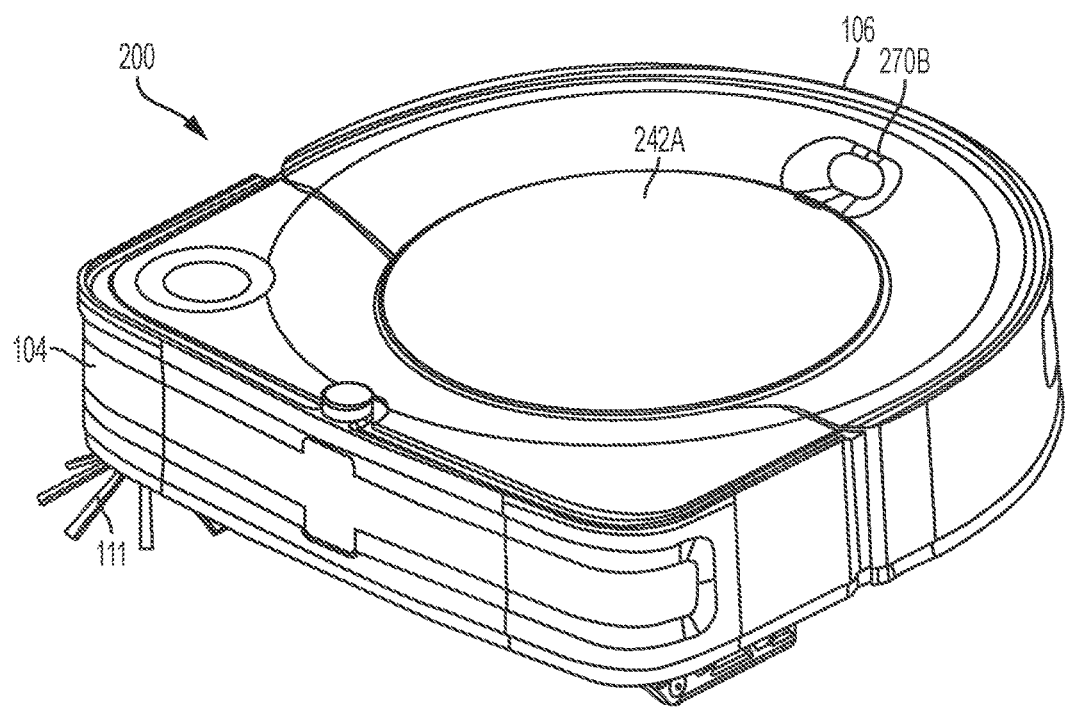
FIGS. 2A and 2B are top and bottom perspective views, respectively, of a mobile robot according to embodiments of the present disclosure, which is configured to operate in the system of FIG. 1A.
Figure 2B:
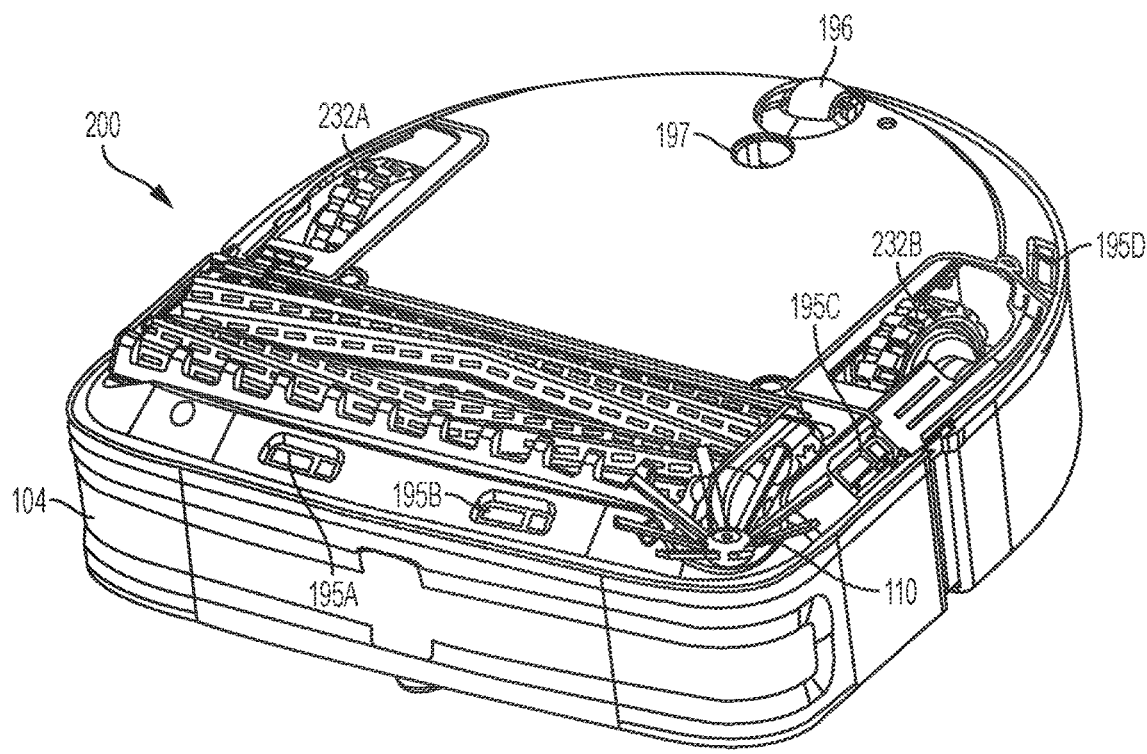
Figure 2C:
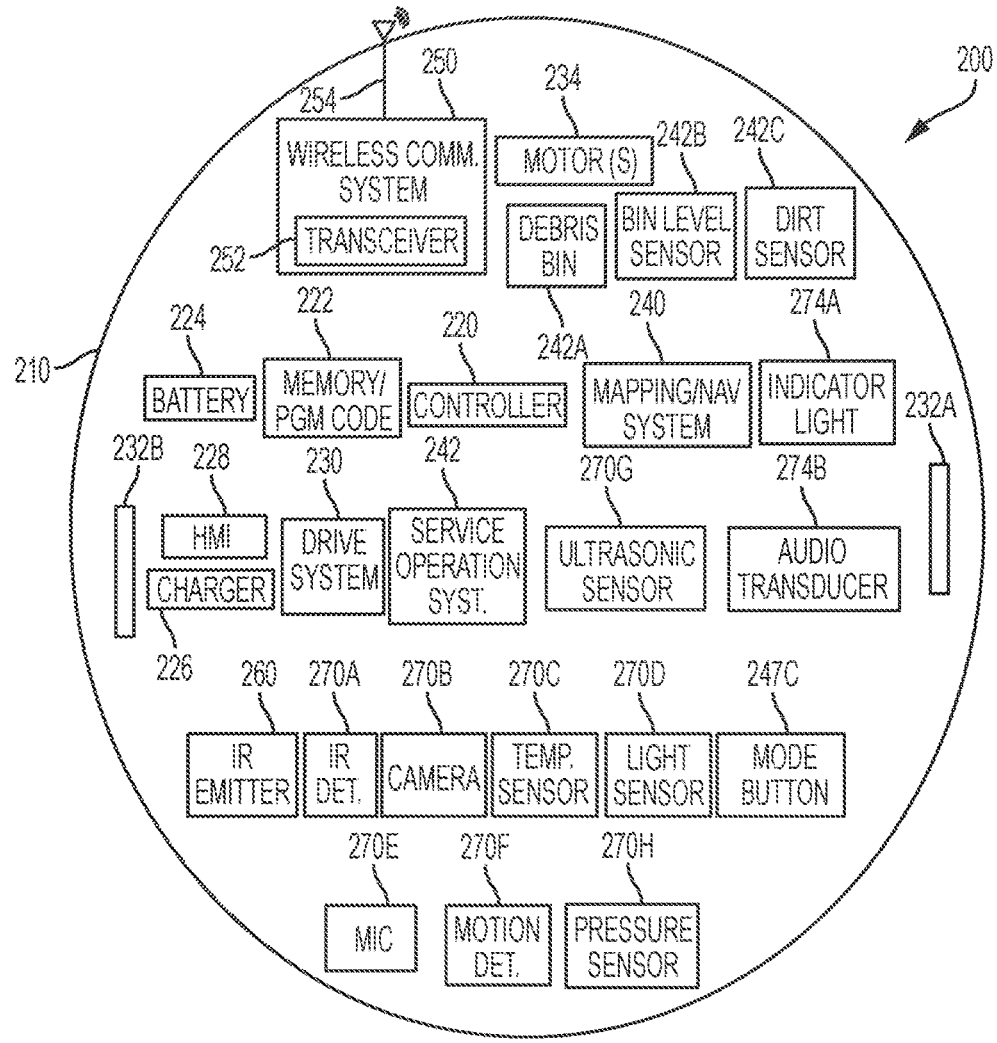
FIG. 2C is a schematic diagram representing a mobile robot according to embodiments of the present disclosure, which is configured to operate in the system of FIG. 1A.
Figure 3:
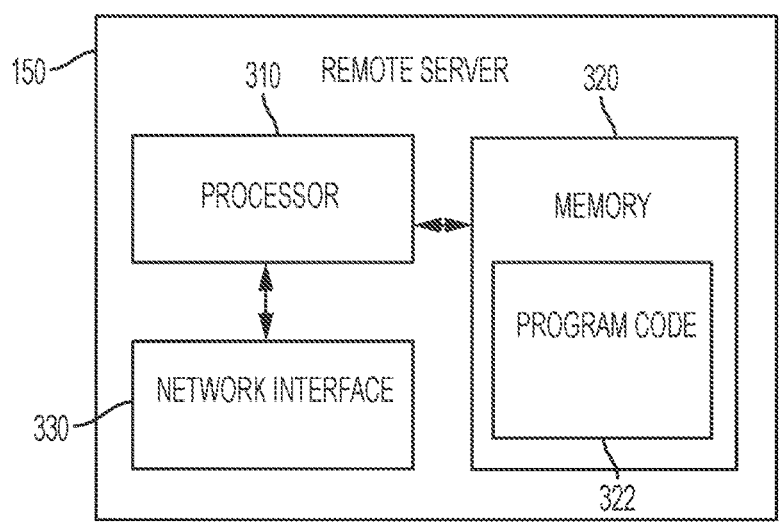
FIG. 3 is a schematic diagram representing a remote server according to embodiments of the present disclosure, which is configured to operate in the system of FIG. 1A.
Figure 4:
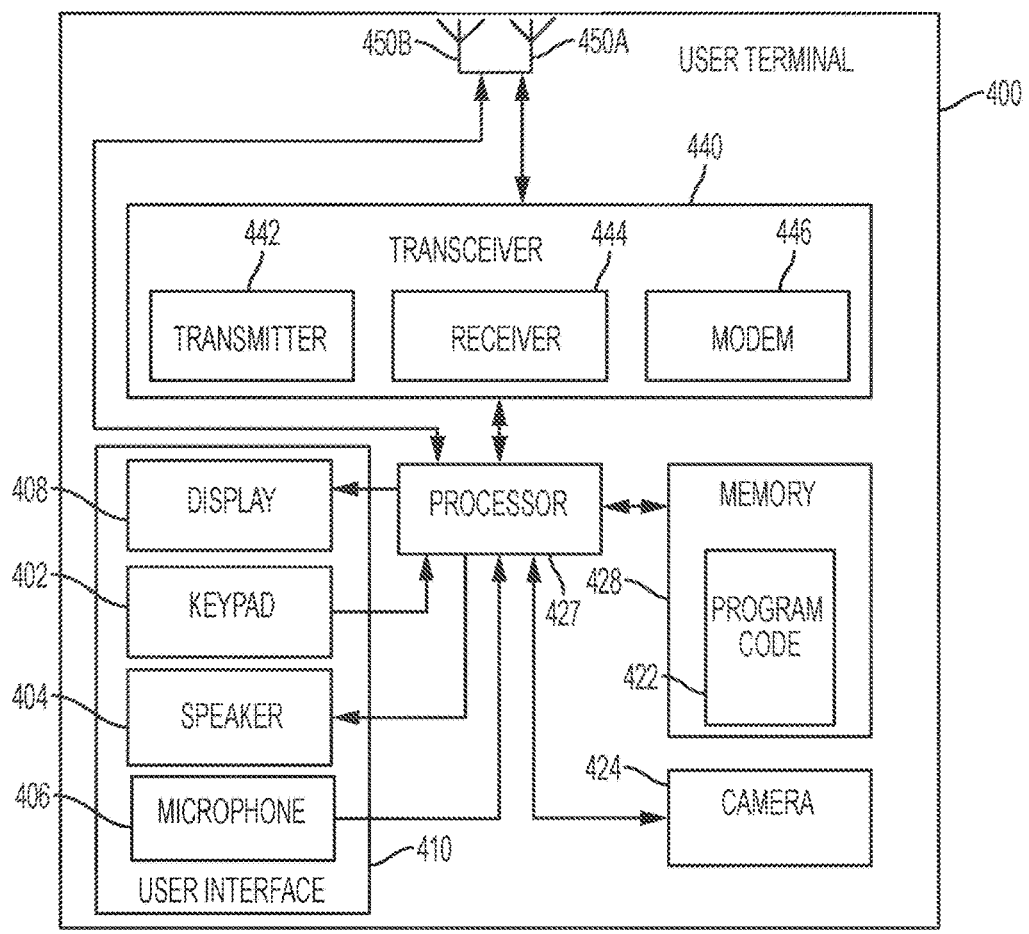
FIG. 4 is a schematic diagram representing a user terminal according to embodiments of the present disclosure, which is configured to operate in the system of FIG. 1A.

The mobile robot 200 may be any suitable robot and associated computing device(s), and it will be appreciated that not all of the components, features and functionality described herein are required in mobile robots according to embodiments of the present disclosure. With reference to FIGS. 2A-2C, the example mobile robot 200 includes a chassis 210, a controller 220, memory 222, a battery 224, a battery charger 226, a human-machine interface (HMI) 228, a drive system 230, a mapping/navigation system 240, a service operation system 242 (also referred to herein as "cleaning system" and "cleaning head"), a wireless communication system 250, an IR emitter 260, and environmental sensors 270A-H, a debris bin 242A (to store debris collected by a cleaning operation), a bin level sensor 242B, a dirt extraction sensor 242C (to detect the density of characteristics of the debris collected by the cleaning operation), an indicator light 274A, an audio transducer 274B, and a cleaning mode selection switch or button 274C.

The environmental sensors 270A-270H may include a camera 270B mounted on a top surface of the mobile robot 200, as shown in the top perspective view of FIG. 2A. The camera 270B can be used to navigate the robot 200 and acquire images for other operational use. In some embodiments, the camera 270B is a visual simultaneous location and mapping (VSLAM) camera and is used to detect features and landmarks in the operating environment and build an occupancy map based thereon.

As shown in the bottom perspective view of FIG. 2B, the mobile robot 200 may further include a bumper 104, cliff sensors 195A-195D, an edge brush 111 mounted or otherwise positioned at a periphery of the mobile robot housing 106. The housing 106 is illustrated in FIGS. 2A-2B as having a squared front section on which the bumper 104 is mounted; however, the housing may have a rounded or circular shape in other embodiments. A caster wheel 196 may be provided on the underside of the mobile robot 200. In some embodiments, the caster wheel 196 may be positioned at an opposite end of the mobile robot 200 than the cleaning head 242, with the drive rollers/tracks 232A, 232B therebetween, such that the cleaning head 242 is a cantilevered arrangement. The mobile robot 200 may also include downward- or floor-facing camera 197. In some embodiments, the mobile robot 200 may be generally configured in the manner of or include features from the Roomba® floor cleaning robot and/or robots as described in U.S. Pat. No. 7,024,278 and U.S. Published Application No. 2007/0250212, the disclosures of which are incorporated herein by reference, with suitable modifications. In other embodiments, the mobile robot 200 may be generally configured as an autonomous patrolling robot that includes a telescoping mast having one or more elements associated with the sensor elements 270A-H and/or the wireless communication circuit or system 250 mounted thereon or otherwise operably associated therewith.

The controller 220 may include any suitably configured processor or processors. The processor(s) may include one or more data processing circuits, such as a general purpose and/or special purpose processor (such as a microprocessor and/or digital signal processor) that may be collocated or distributed across one or more networks. The processor is configured to execute program code stored in the memory 222, described below as a computer readable storage medium, to perform some or all of the operations and methods that are described above for one or more of the embodiments. The memory 222 is representative of the one or more memory devices containing the software and data used for facilitating operations of the robot in accordance with some embodiments of the present disclosure. The memory 222 may include, but is not limited to, the following types of devices: cache, ROM, PROM, EPROM, EEPROM, flash, SRAM, and DRAM. The processor is thus in communication with the controller 200, memory 222, the cleaning system 242 and drive system 230.

The drive system 230 may include any suitable mechanism or system for actively and controllably transiting the robot 200 through the living space 20. According to some embodiments, the drive system 230 includes a roller, rollers, track or tracks 232A, 232B and one or more onboard (i.e., carried by the mobile robot 200) electric motors 234 (collectively referred to herein as a "drive" or "drive system") operable by the controller 220 to convey the robot 200 across the floor of the operating environment 10.

The service operation system 242 may be optional in some embodiments, and is operable to execute a service operation in the living space 20. According to some embodiments, the service operation system 242 includes a floor cleaning system that cleans a floor surface of the living space 20 as the robot 200 transits through the space 20. In some embodiments, the service operation system 242 includes a suction head and an onboard vacuum generator to vacuum clean the floor. In some embodiments, the service operation system 242 includes an end effector such as (but not limited to) a sweeping or mopping mechanism, one or more rotating brushes, rollers, wet or dry stationary or oscillating and/or vibrating cloths, or multilayer pad assemblies.

The wireless communication system 250 includes a wireless communication transceiver or module 252 and an associated antenna 254 to enable wireless communication between the robot 200 and the various other connected devices 120, 122, 124, 126, 127, 128 in the operating environment 10, as well as network segments serviced by WAPs, gateways and hubs which make up the private network 160, of which the mobile robot 200 constitutes a node. For example, the wireless communication transceiver or module 252 may be a Wi-Fi module.

In some embodiments, the robot 200 may communicate wirelessly directly with the dock 140 using narrowband or broadband RF communication. For example, if the robot 200 is not equipped with a transmitter compatible with the WAP 164, the robot 200 may communicate with the dock 140, which may in turn relay data from the robot 200 onto the private network 160 and onward to the intended network entity (such as the remote management server 150). In some embodiments, the dock 140 includes a network bridge device that receives and converts RF signals from the robot 200 and relays them to the router 162 in a format supported by the router for delivery to the remote management server 150 or another device in the private network 160. In some embodiments, the dock 140 includes a low power mesh data network employing a mesh topology wherein RF communications signals are relayed from node to node between the mobile robot 200 and the dock 140. In this case, the connected devices 120, 122, 124, 126, 127, 128, 140 and range extender modules (if any; not shown) may serve as mesh nodes. Likewise, the mobile robot 200 may serve as a node to relay signals between the dock 140 and the other nodes (such as network enabled sensor devices 120, 122, 124, 126, 127, 128, 140 and range extenders).

The remote management server 150 may be any suitable computing device(s), computer server(s) or cloud service(s), or a combination thereof, and it will be appreciated that not all of the components, features and functionality described herein are required in remote server(s) according to embodiments of the present disclosure. With reference to the example of FIG. 3, the remote management server 150 includes one or more network interfaces 330, processor circuitry ("processor") 310, and memory 320 containing program code 322. The network interface 330 can be configured to communicate through one or more wired and/or wireless networks with any associated available resource server(s) and/or data repositories. The processor 310 may include one or more data processing circuits, such as a general purpose and/or special purpose processor (such as a microprocessor and/or digital signal processor) that may be collocated or distributed across one or more networks. The processor 310 is configured to execute program code 322 in the memory 320, described below as a computer readable storage medium, to perform some or all of the operations and methods that are described above for one or more of the embodiments. The memory 320 is representative of the one or more memory devices containing the software and data used for facilitating operations for managing the robot in accordance with some embodiments of the present disclosure. The memory 320 may include, but is not limited to, the following types of devices; cache, ROM, PROM, EPROM, EEPROM, flash, SRAM, and DRAM. The remote server 150 of FIG. 3 thus illustrates hardware/software architectures that may be used in managing and/or distributing information obtained by a mobile robot according to some embodiments described herein. However, it will be understood that embodiments of the present disclosure are not limited to such a configuration but are intended to encompass any configuration capable of carrying out operations described herein. The remote management server 150 may thus more generally represent any device or network of devices that provide a remote management service having the capability to receive, process, enhance, store and transmit data to and from one or more robots 200 in service, using any appropriate combination of relevant methods and technologies. The remote management service 150 also provides additional processing to support other clients with different needs than the robot 200, such as visualizations and other rich UI interactions for presentation on user terminals 142, 144. In some embodiments, the functions assigned herein to the remote management service 150 may also be performed wholly or in part locally on the robot, or in concert/coordination with a group of robots and/or servers in communication.

The user terminals 142, 144 may be any suitable stationary or mobile computing device(s) (including desktop computers, laptop computers, and "smartphones") and it will be appreciated that not all of the components, features and functionality described herein are required in user terminals according to embodiments of the present disclosure. With reference to the example of FIG. 4, an example user terminal 400 is configured to transmit and/or receive communication signals over multiple wired and/or wireless communication interfaces. For example, a transceiver 440 of the user terminal 400 according to some embodiments can include a cellular communication module, an infrared (IR) communication module, a global positioning system (GPS) module, a WLAN module, a wireless personal area network (WPAN)

module, such as a Bluetooth, Wi-Fi, ZigBee, and/or Z-wave module, and/or other types of communication modules.

A user interface 410 of the user terminal 400 includes a display 408, such as a liquid crystal display (LCD) and/or an organic light emitting diode (OLED) display. The user interface 410 may optionally include a keypad 402 or other user input mechanism on the housing of the user terminal 400. In some embodiments, the display 408 may be provided with touch screen capability to replace and/or supplement the keypad 402. The user interface 410 may further include a microphone 406 and an earphone/speaker 404. The housing may be designed to form an acoustic seal to the user's ear when the earphone/speaker 404 is placed against the user's head.

The keypad 402, display 408, microphone 406, speaker 404 and camera 424 may be coupled to a processor 427, such as a microprocessor or microcontroller, which may be configured to control operations of the user terminal 400. The user terminal 400 may further include a transceiver 440 and a memory 428 coupled to the processor 427. Other electronic circuitry, such as a WLAN communication interface, a Bluetooth interface, a GPS interface, a digital signal processor, etc., may also be included in the electronic circuitry of the user terminal 400.

The memory 428 may be a general purpose memory that is used to store both program instructions 422 for the processor 427 as well as data, such as audio data, video data, configuration data, and/or other data that may be accessed and/or used by the processor 427. The memory 428 may include a nonvolatile read/write memory, a read-only memory and/or a volatile read/write memory. In particular, the memory 428 may include a read-only memory in which basic operating system instructions are stored, a non-volatile read/write memory in which re-usable data, such as configuration information, directory information, and other information may be stored, as well as a volatile read/write memory, in which short-term instructions and/or temporary data may be stored.

The transceiver 440 includes a transmitter circuit 442, a receiver circuit 444, and a modem 446, which cooperate to transmit and receive radio frequency signals to remote transceivers via an antenna array 450A, 450B. The radio frequency signals transmitted between the user terminal 400 and the remote transceivers may include both traffic and control signals (for example, paging signals/messages for incoming calls), which are used to establish and maintain communication with another party or destination. More particularly, the transceiver 440, in cooperation with the processor 427, may be configured for communication according to multiple radio access and/or wireless networking technologies, including (but not limited to) cellular, WLAN (including 802.11), WiMAX (Worldwide Interoperability for Microwave Access), Wi-Fi, Bluetooth, ZigBee, and/or Z-wave. Other radio access technologies and/or frequency bands can also be used in embodiments according to the present disclosure.

With reference again to FIG. 2C, the mobile robot 200 may include a localizing circuit that builds a metric, range-based map of walls and obstacles (using, for example, a laser range finder, sonar, radar, triangulation, time-of-flight, or phase difference calculating) and/or an occupancy map of free space (for example, traversable floor space, or floor space not occupied by an object or fixture), and can localize the robot on the map(s) using techniques such as scan matching, ICP (iterative closest point), and/or RANSAC (RANdom Sample consensus). Additionally or alternatively, the mobile robot 200 may include a localizing circuit that builds a fingerprinted, feature-based constellation or topological map of features, landmarks, fiducials and/or beacons (using, for example, a camera or point cloud generating 3D scanner, together with a feature transform to identify, store, and recognize natural or artificial keypoints, features, and/or landmarks) within an occupancy map of free space, and can localize the robot on this occupancy map using techniques such as VSLAM (vision-based/visual simultaneous localization and mapping). In either case, a unique identity linked to unique rooms or areas (illustrated as Zone 1, Zone 2, Zone 3) may be associated by an end user with a household room-type or unique room label ("Living Room") via the user interface of any of the network entities. The occupancy map (also referred to herein as a "floorplan" for the operating environment) may include data defining multiple surface locations of the environment 10 (for example, by pixels), each having a value that corresponds to whether the pixel location corresponds to a surface location that is occupied, traversable by the mobile robot 200, or unexplored. The localizing circuit may be defined by inputs from one or more of the sensors 270A-270H of the mobile robot 200, which may be used by the controller 220 to perform localization in the operating environment 10.

More particularly, one or more of the localizing sensors 270A-270H are configured to detect sensor readings from objects located in the operating environment 10, and the controller 220 is configured to determine a current pose (a "pose" includes an absolute or relative location and optionally an absolute or relative orientation) of the mobile robot 200 with reference to the observed objects ("objects" not only including physical objects including observable features, as well as surface "objects" formed of optically or otherwise detectable surface characteristics such as corners, lines, patterns) based on the localization data detected by the localizing sensors 270A-270H. Poses for objects may be determined as well. The mobile robot 200 may be further configured to associate a robot pose (or location) with a room identifier specifically associated with the observed objects or their poses stationed in the room or observable upon the room's components (walls, ceiling, lighting, doorway, furniture), as indicated by the occupancy map.

In addition, with reference to FIG. 2C, the mobile robot may include a wireless signal mapping circuit or capability that collects data as the input to a software-defined process which builds and refines a signal coverage map, including data defining coverage patterns and signal strengths of wireless communication signals acquired or otherwise detected at respective locations of the surface. The signal coverage map may also be used to localize the robot 200 in combination with the occupancy map obtained via techniques such as VSLAM. More particularly, during navigation of the operating environment 10 (for example, while on a cleaning mission), the controller 220 of the mobile robot 200 is configured to acquire wireless communication signals at respective locations in the operating environment via the wireless communication circuit 250. The wireless communication signals may be transmitted by one or more other electronic devices that are local to the environment 10 (such as a connected device 120, 122, 124, 126, 127, 128). The coverage patterns of the wireless communication signals sensed in the operating environment may be associated with the respective locations and stored in memory 222 to provide a wireless signal 'terrain' map covering the operating environment, correlated to the floorplan sensed by other means, including but not limited to visual simultaneous localization and mapping (VSLAM) techniques. This 'terrain' map may represent signal characteristics including received signal strength, signal-to-noise ratio (SNR), data throughput, and/or multipath distortion at respective locations of the floorplan, and may be visually represented in a 3-dimensional topographical format. The combination of received wireless communications and/or signal strengths/SNR/data throughput/distortion thereof may identify a unique location in the operating environment (or small set, if ambiguous), and/or may be used to discard or eliminate potential candidates for the location deduced by other means, which are unlikely given the RF 'terrain' being sensed. The controller 220 is configured to thereby determine a location of the mobile robot 200 in the operating environment 10 based not only on the occupancy data obtained via the localizing sensors 270A-270H, but also based on the signal coverage data obtained via the wireless communication circuit 250, such that localization and re-localization may require less time.

For example, if the mobile robot 200 is picked-up and moved to a 'new' location in the operating environment, the controller 220 may determine the new location of the mobile robot 200 in the operating environment based on the received signal strength, the slope of the received signal strength, and/or the direction of change of the slope at the new location, as indicated by the 'terrain' map. The controller 220 may further determine and/or verify the current pose of the mobile robot 200 based on the direction in which the slope of the signal strength changes with movement at the new location, alone or in combination with visual localization techniques.

In some embodiments, the controller 220 of the mobile robot 200 may be configured to determine the location of the mobile robot 200 (including the current pose) based on correlation of the occupancy data and the signal coverage data, for instance, relative to locations of one or more of the devices 120, 122, 124, 126, 127, 128 in the operating environment 10. The correlation of the occupancy data and the signal coverage data may be performed by the controller 220 of the mobile robot 200 itself in some embodiments. In other embodiments, the occupancy data and the signal coverage data obtained by the mobile robot 200 may be transmitted to the remote server(s) 150, which may perform correlation of the occupancy data and the signal coverage data, and may communicate data to and from the mobile robot 200 for use in localization.

Figure 5A:
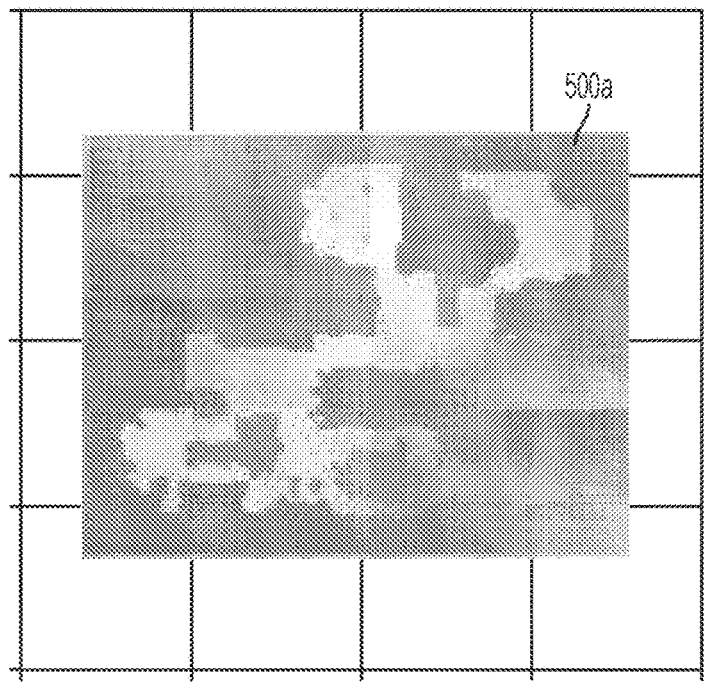
FIG. 5A is a graph illustrating coverage patterns of wireless communication signals acquired by a mobile robot according to embodiments of the present disclosure at various locations in an operating environment.
Figure 5C:
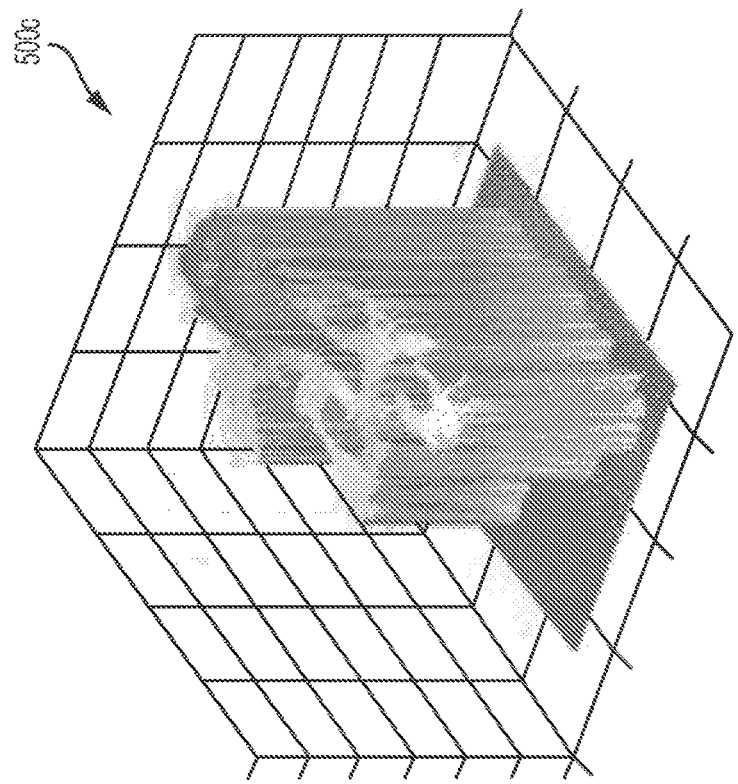
FIGS. 5B and 5C are topographical graphs illustrating coverage patterns of wireless communication signals acquired by a mobile robot according to embodiments of the present disclosure at various locations in an operating environment.
Figure 5B:
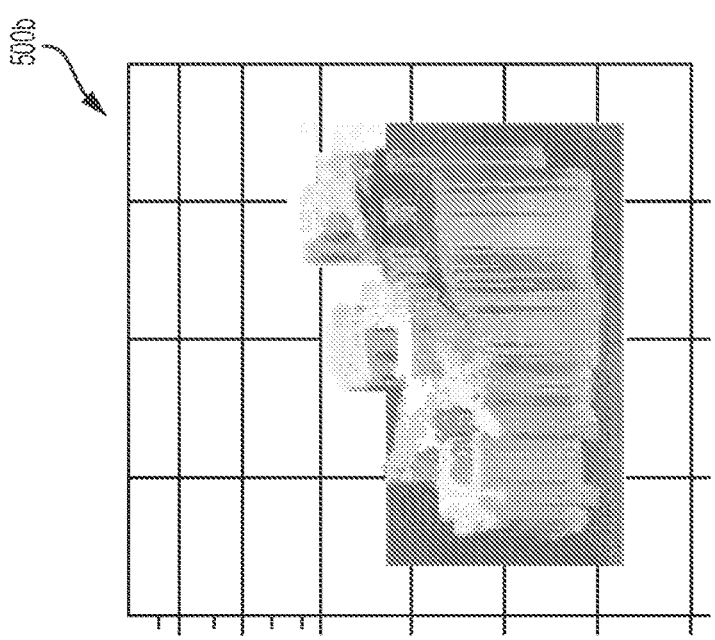

With reference to FIGS. 5A, 5B, and 5C, operations are performed by the mobile robot 200 and/or remote server 150 to map the Wi-Fi fields of one or more electronic devices in an operating environment, such as the environment 10 shown in FIG. 1B, to determine respective locations of the electronic devices in the operating environment. The operations for acquiring the Wi-Fi signals shown in FIGS. 5A-5C may be performed while the mobile robot 200 is navigating the operating environment on a primary mission, for example, a cleaning and/or patrolling mission. In particular, during navigation of the operating environment, the wireless communication circuit 250 of the mobile terminal may acquire Wi-Fi signals indicating signal coverage at multiple locations in the operating environment, for instance, using a single- or multi-channel scan. The controller of the mobile robot 200 (and/or the remote server 150 in communication therewith) may determine respective signal characteristics (including but not limited to signal strength, signal-to-noise ratio, data throughput, and/or multipath distortion) of the wireless communication signals at the respective locations in the operating environment based on the coverage patterns, and may determine respective locations of the electronic devices local to the operating environment based on the respective signal characteristics. In addition, after analysis of data collected during an initial navigation of the environment (which may be referred to herein as a 'primary mission'), additional specialized missions (or modification of a subsequent primary mission) may be scheduled to capture more data to refine the derived information (for example, to capture a higher density of information in an area where the data initially collected is determined to be ambiguous, or of particular interest). The determined signal characteristics of the Wi-Fi fields may be visually represented (for example, for display via a user terminal 142, 144, 400) in various forms. In some embodiments, the determined signal characteristics of the Wi-Fi fields for each detected device may be separately visually represented (for example, for location determination), while in other embodiments, a visual representation of the determined signal characteristics may be visually represented collectively (for example, for detection of interfering obstacles/structures).

For example, FIG. 5A is a 2-dimensional graph illustrating coverage patterns 500a of Wi-Fi signals acquired by the wireless communication circuit 250 of the mobile robot 200 at various locations in the operating environment (represented by the X- and Y-axes), where the signal intensity of the received Wi-Fi signals (also referred to herein as received signal strength) is represented by colors and/or brightness levels that vary according to received signal strength at the corresponding locations in the operating environment (also referred to herein as a 'heat map'). FIGS. 5B and 5C are 3-dimensional topological graphs illustrating the coverage patterns 500b and 500c, respectively, acquired by the wireless communication circuit 250 of the mobile robot 200 at various locations in the same operating environment (represented by the X- and Y-axes), with the signal intensity of the received Wi-Fi signals at the respective locations in the operating environment represented by the Z-axis. The graphs of FIGS. 5A-5C, represent the changes in signal intensity with location for a single electronic device from which the Wi-Fi signals were transmitted. As such, the location with the highest signal strength (shown by the highest brightness/intensity in FIG. 5A or the highest peak in the topography in FIGS. 5B and 5C) is indicative of the location of the corresponding electronic device from Which the Wi-Fi signals were transmitted. In other words, the peak corresponds to the point of emanation of the signals. Similar graphs may be generated for other electronic devices in the operating environment. In some embodiments, multiple graphs may be combined or overlaid such that respective peaks in the overlaid topographies are indicative of respective locations of multiple electronic devices.

In addition, changes in slope and direction of slope shown in the topography of the coverage patterns 500b and 500c of FIGS. 5B and 5C are indicative of changes in signal strengths at relative locations in the operating environment. The angle of the slope (and/or the rate of change of the slope) shown in the topography of the coverage patterns 500b and 500c of FIGS. 5B and 5C may also help in resolving the pose of the mobile robot 200. For example, the direction and rate in which the slope of the signal strength changes relative to a peak signal strength (which indicates the position of the electronic device transmitting the signals) may allow the mobile robot 200 to determine its pose more quickly, either alone or in combination with visual localization techniques (for example, using camera-based recognition).

The received signal strength peak, along with changes in slope and direction of slope thereof shown in the topography of the coverage patterns 500b and 500c of FIGS. 5B and 5C may also be used to identify the location of a network-enabled device, even if it outside the area mapped, by extending the surrounding slopes in the data collected, to project where the peak should be located. This may address situations where the collected data does not indicate a clear 'peak' for a network-enabled device within the area mapped. Such changes in signal strength may also be used to identify locations of the operating environment with weak or no signal coverage ('dead spots'), and/or structures in the operating environment that may contribute to or be responsible for the changes in signal strength ('shadows'). For example, a rapid change in slope between locations of the operating environment shown in the topographies 500b and 500c of FIGS. 5B and 5C may indicate the presence of one or more structures that may be interfering with signal transmission at or near those locations. In further embodiments described in greater detail below, one or more recommendations for improving signal coverage (such as moving a Wi-Fi router to a different location and/or placement/orientation) may be provided based on analysis of the changes in signal strength indicated by the topological maps 500b and 500c over up to the entire surface of the operating environment.

Operations can be performed at multiple frequencies/channels and/or technologies to generate respective coverage patterns for each device from which wireless communication signals are detected in the operating environment. For example, the Wi-Fi signal data acquired by the mobile robot 200 may also be used for resolving persistent maps, by using the Wi-Fi device locations indicated by the detected signal strengths as anchor points for merging respective occupancy maps generated from VSLAM data obtained at different times and/or under different lighting conditions.

With reference to FIGS. 6A, 6B, and 6C, operations are performed by the mobile robot 200 and/or remote server 150 to correlate the signal coverage data 500a based on the wireless communication fields detected during navigation of the mobile robot 200 in an operating environment (such as the environment 10 shown in FIG. 1B) with occupancy data 600 based on the data detected by the localization sensors 270A-270H during navigation of the mobile robot 200 in the operating environment to generate multiple maps 605 indicating the coverage pattern of the wireless communication signals for each network-enabled device at respective locations in the operating environment. More particularly, such examples of maps 605 of FIG. 6C illustrate the signal strength of the wireless communication signal coverage patterns 500a of FIG. 6A as directly correlated and overlaid on the occupancy or floorplan map 600 of FIG. 6B.

The wireless communication coverage patterns 500a of FIG. 6A correspond to a particular device or device type in the operating environment. For example, the wireless communication circuit 250 of the mobile robot 200 may be configured to detect the presence of one or more Wi-Fi routers located and/or transmitting in the operating environment 10 based on a single-channel or multi-channel scan. The mobile robot 200 may further utilize the wireless communication coverage patterns 500a to identify areas of the operating environment 10 where signal coverage is weak or absent (i.e., 'dead spots'), and in some embodiments described in greater detail below, provide recommendations for improvement of coverage.

The multi-channel scan may be used to build a list of available wireless network access points in the operating environment 10, which in the example of FIG. 1B is provided by WAP 164. In some embodiments, each multi-channel scan may require approximately 3 seconds to complete. In particular, as some access points may transmit a beacon at approximately every 104 milliseconds (ms)-110 ms, the wireless communication circuit 250 should perform the scan of each channel for longer than 104 ms. The wireless communication circuit 250 may require approximately another 100 ms-120 ms to change the Wi-Fi channel, and the 2.4 $GH_z$ band has 11 channels in U.S. (or 13 in Europe, or 14 in Japan), thereby requiring about 2990 ms (13 channels×(110 ms+120 ms)). During motion of the mobile robot 200 in the environment 10, the samples from the multi-channel scan may be too sparse to define the coverage patterns 500a shown in FIG. 6A. Thus, the mobile robot may pause every 0.25 meters or so for the 3+ seconds when performing the multi-channel scan. Such a scan may also collect information about access points only, rather than for additional types of connected devices in the environment. In other embodiments, the robot 200 may monitor only one channel during a mission, but may rotate which channel is being monitored on each mission, thus collecting the information over an extended period, instead of extending the time taken for a single mission to complete.

The single-channel scan may be performed in a manner similar to the multi-channel scan, but may only be performed for the particular channel of the WAP 164. For example, the single-channel scan may be locked to, or performed only for, the particular channel. The single-channel scan may thus report all access points on the same channel as the WAP 164. The samples from the single-channel scan may be of sufficient density to define the coverage patterns 500a while moving the mobile robot 200 in the environment 10, such that pausing of the mobile robot 200 during the single-channel scan may not be necessary.

The wireless communication circuit 250 of the mobile robot 200 may further include one or more chipsets configured to operate in a 'monitor mode' to detect the presence of multiple connected devices in the operating environment, such as the connected devices 120, 122, 124, 126, 127, 128 in the environment 10 of FIG. 1B. In some embodiments, the monitor mode may be implemented to inspect wirelessly transmitted packets using a PCAP-compatible network sniffing tool, such as Wireshark™. For example, the wireless communication circuit 250 may be configured to passively inspect the header information of all packets received, including data packets not addressed to this device, and link-level management packets not normally passed through to the computer, in a manner similar to the 'promiscuous mode' available on some Ethernet adapters. As such, all devices transmitting wireless communication signals within range of the wireless communication circuit 250 (including devices that transmit data packets relatively infrequently) may be visible to the mobile robot 200. Through such dense sampling of a comparatively large number of packets, the monitor mode may allow for very dense data collection, even while the mobile robot 200 is moving through the operating environment 10. In addition, the link-level packets may contain rich information (which may help to identify the type/model of the transmitting device). In some embodiments, the streams of information may be merged and stored in a common file, for example, using a packet capture (PCAP) format, with robot position inserted as faked network packets, and may be stored in the memory 222 of the mobile robot for use by the controller 220 and/or transmission to the remote server(s) 150. In other embodiments, the captured information may be stored in separate files, each entry time-stamped as it is received from a common time source, so that the separate streams can be correlated as needed during later processing.

Responsive to coverage patterns detected by scanning the operating environment via the wireless communication circuit 250, the mobile robot 200 (alone or in cooperation with the remote server 150) may be further configured to identify one or more of the connected devices 120, 122, 124, 126, 127, 128 by type of device, manufacturer, and/or model, for example, based on addressing and/or network services information determined by passively listening or by actively probing the device. For example, the mobile robot 200 may be configured to passively listen to transmitted packets via the wireless communication circuit 250 to determine a list of media access control (MAC) addresses in the operating environment. Such hardware (MAC) addresses may indicate the manufacturer of a device, as the first 24-36 bits (of 48) of MAC addresses may conventionally be allocated to particular manufacturers by a central authority. Address Resolution Protocol (ARP) may be used to translate MAC address to IP address for devices on the private network 160 (or vice-versa). Devices may also be identified as mobile or stationary, for example, either implied by identifying the type/model of the device (for example, a wall-mounted thermostat, security camera or smoke detector) or heuristically by monitoring variations (or lack thereof) in the signal strengths/coverage patterns of the wireless communication signals acquired therefrom. For example, when the mobile robot is stationary, variations in the received signal strength may indicate motion of a device. That is, stationary devices can be distinguished from mobile devices based on the consistency of the wireless signal strengths/coverage patterns received therefrom.

In addition, the mobile robot 200 may be configured to actively probe the network via the wireless communication circuit 250 to discover and identify active devices, both wired and wireless. Probing network services can be used to narrow the possible candidates for model/type, from the manufacturer indicated by the MAC address, to a specific model. For example, a Nest™ brand device can be identified specifically as a Nest Thermostat™, a Nest Protect™, or a Nest Camera™. Network services provided by the connected device may also reveal a 'friendly' (i.e., user-understandable) name assigned by the user, which may indicate placement or intended usage information about the device, from the user's perspective. For example, a lighting device which has been assigned the name 'Kitchen' by the user may indicate that the lighting device is located in the kitchen. In some embodiments, these network services may be provided by the gateway/hub itself, on behalf of the connected devices, so that the devices themselves can be simpler. For example, one hub may handle many lightbulbs and/or wall switches implemented using a wireless protocol intended for IoT devices, such as Zigbee or Z-Wave.

Furthermore, the mobile robot 200 may be configured to create (or enhance) a 'fingerprint' (which may refer to a unique combination of detected characteristics) of a detected device by actively probing the services it offers to other network entities via the wireless communication circuit 250. Particular embodiments may use a variety of techniques to distinguish between manufacturers, their products and versions of a product. These may include (but are not limited to) a port scan to identify services exposed, pattern-matching against the responses received (such as HTML content returned by an embedded web server, initial logon banner from a terminal connection, etc.), and interacting with certain discovered services to extract more structured information (for example, attributes that the device advertises through network 'discovery' protocols such as UPnP or mDNS). Devices may also be identified and/or enumerated indirectly by requesting information kept by gateways/hubs (such as the hub 110 of FIG. 1B) about the devices to which they are coupled. For example, a device coupled to a SmartThings™ hub may be identified as a Philips Hue™ light bulb by interrogating just the hub.

Figure 7:
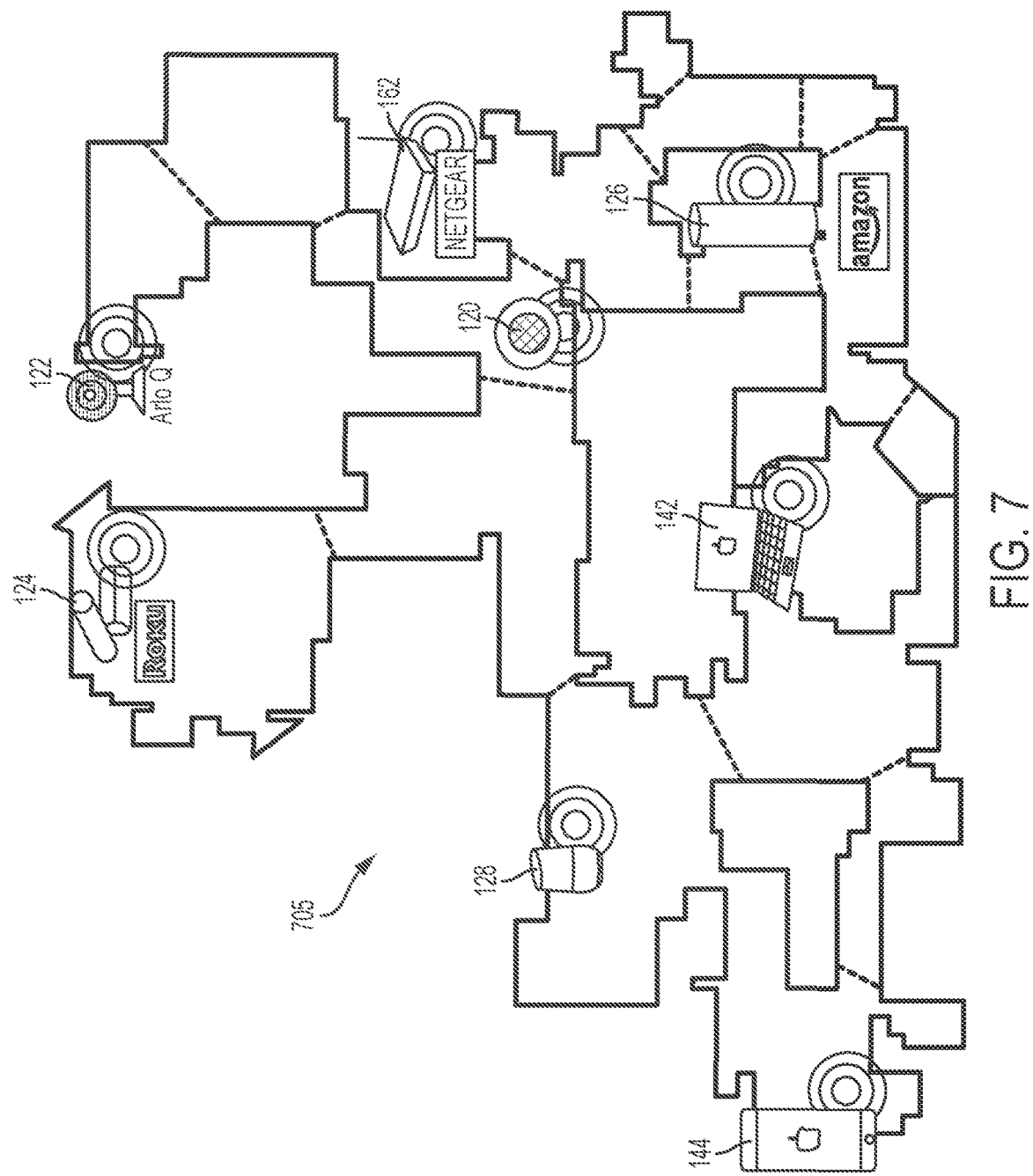
FIG. 7 is a populated floorplan illustrating respective locations and identifications of connected devices, based on correlation of signal coverage data and occupancy data obtained by a mobile robot according to embodiments of the present disclosure.

With reference to FIG. 7, based on the above and/or other device identification techniques, the mobile robot 200 and/or the remote server 150 may be configured to automatically (i.e., without human intervention) determine the location of each identified device, based on the coverage data 500a. In particular, the location on the occupancy map 600 corresponding to the highest respective received signal strength of the coverage data 500a for each identified device may be used by the mobile robot 200 and/or the remote server 15 to automatically generate a persistent map 705 indicating the respective positions of connected devices 120 (illustrated as a Nest Thermostat™ device), 122 (illustrated as an Arlo Q™ network camera), 124 (illustrated as a Roku™ set-top device), 126 (illustrated as an Amazon Echo™ device), 128 (illustrated as a Google Home™ device), 142 (illustrated as an Apple MacBook™), 144 (illustrated as an Apple iPhone™), and 162 (illustrated as a Netgear™ wireless router). In addition, based on identification of the device and its position in the operating environment, the mobile robot 200 and/or the remote server 150 may be further configured to determine a likely placement and/or orientation of the device. For example, a thermostat device (such as a Nest™, Ecobee™, or Honeywell™, thermostat device) may be identified as being on the wall, at approximately eye level, at its determined location; a Smart plug (such as a Wemo™, TP-Link™, D-Link™, or Orvibo™ smart plug) may be identified as being at outlet level at its determined location; and a light bulb (such as a Lifx™, TCP™, or Flux™ light bulb) may be identified as hanging from the ceiling at the determined location.

Based on determining the likely placement of the identified devices at the respective locations, the mobile robot 200 and/or the remote server 150 may be configured to correlate the placement and the location with an image of the corresponding device, for example, as captured in the localization data detected by the mobile robot 200 during navigation of the environment. For example, the mobile robot 200 may capture visual localization data (such as an image, or 360° panoramic image) at the respective locations in the operating environment 10 via the camera 270B and may store the visual localization data in the memory 222. The determined locations of the connected devices 120, 122, 124, 126, 128, 142, 144, and 162 in the operating environment 10 and the likely placements thereof at the determined locations may allow for matching of the captured images at those respective locations with the identifications of the connected devices 120, 122, 124, 126, 128, 142, 144, and 162. Identifying each device and its approximate location may thus increase the accuracy and/or practicality of machine-based vision in accordance with embodiments of the present disclosure.

Figure 8A:
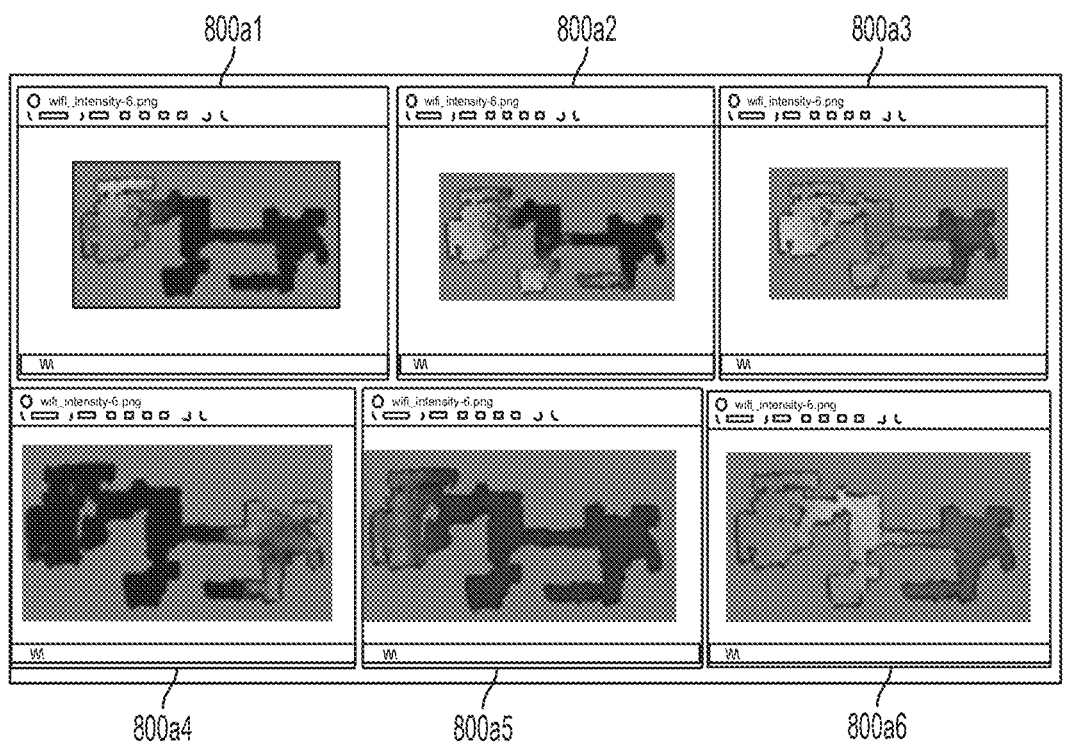
FIGS. 8A and 8B illustrate 2-dimensional and 3-dimensional coverage patterns, respectively, based on correlation of signal coverage data and occupancy data obtained by a mobile robot according to embodiments of the present disclosure.
Figure 8B:
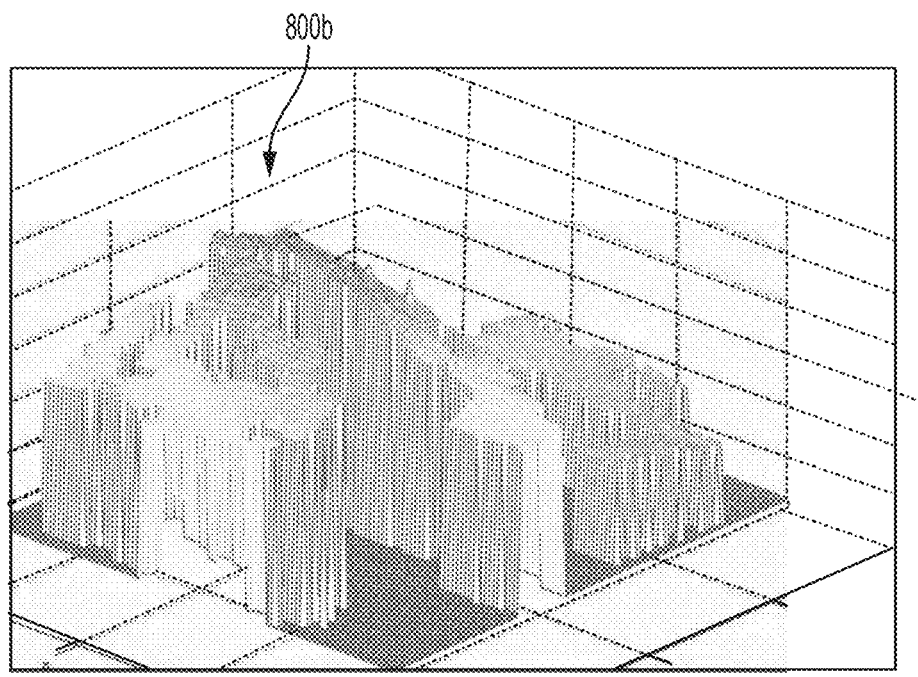

FIGS. 8A and 8B illustrate specific examples of mapping Wi-Fi fields transmitted by connected electronic devices in a 'smart' home in accordance with embodiments of the present disclosure. With reference to FIG. 8A, the maps 800a1-800a6 illustrate a coarse sampling of Wi-Fi signals in mapped section of a single-story home, where the Wi-Fi signal intensity is plotted into a floorplan or occupancy map obtained from localization data collected during navigation of the home by a mobile robot.

The six individual maps 800a1-800a6 indicate the signal patterns detected from six different wireless access points located inside or near the home. In the examples of FIGS. 8A and 8B, the width of the home is roughly 60 feet across in the horizontal direction. For these specific plots 800a1-800a6, the mobile robot performed initial mapping for the sections of the home using one or more of its localization sensors, and subsequently performed a multi-channel network scan at respective locations in the home using its wireless communication circuit, with about one multi-channel scan every 10 square feet. Each multi-channel scan took a few seconds to complete, and a sub-set of locations were plotted on the map. The coverage patterns of the six different Wi-Fi access points shown by the maps 800a1-800a6 are distinct, and the relative locations of each of the access points is visually represented by relative brightness in the maps 800a1-800a6. For example, the map 800a4 shows a cellular hotspot placed in the room on the far right of the map 800a4. The bright spots and unevenness in the signal are artifacts of the sparse sampling method. In contrast, the map 800a6 shows the Wi-Fi signal from the main access point for the home's Wi-Fi router. The signal is strong overall and the access point is placed toward the center of the home, which matches the brightest areas of the map 800a6.

In addition to running the full, multi-channel network scans shown in FIG. 8A, an alternative process to measure Wi-Fi signal strength is shown in FIG. 8B by performing a single-channel network scan to continuously record the packets for a single channel and frequency. The single-channel scan, in combination with 'Monitor Mode' described previously, provides significantly more measurements (10× to 100× more than the multi-channel approach) as the mobile robot may listen continuously as it is moving and mapping the home. An example of this continuous signal scan for the main access point of the home is shown in the full surface topographical map 800b of FIG. 8B. The increased sampling provided by the continuous signal scan is illustrated by the smooth terrain in the map 800b. The map 800b indicates the location of the access point by following the changes in slope of the topography up to the highest point on the graph. Likewise, changes in direction of the slope and height of the topography shown in the map 800b may be used to identify locations of the operating environment with weak or no signal coverage, and/or structures in the operating environment (for example, walls) that may contribute to the reduction or loss of signal coverage. Also, in some embodiments, by continuously scanning and capturing the signals from multiple positions, noise components of the signals may be reduced or may otherwise even out.

Figure 9:
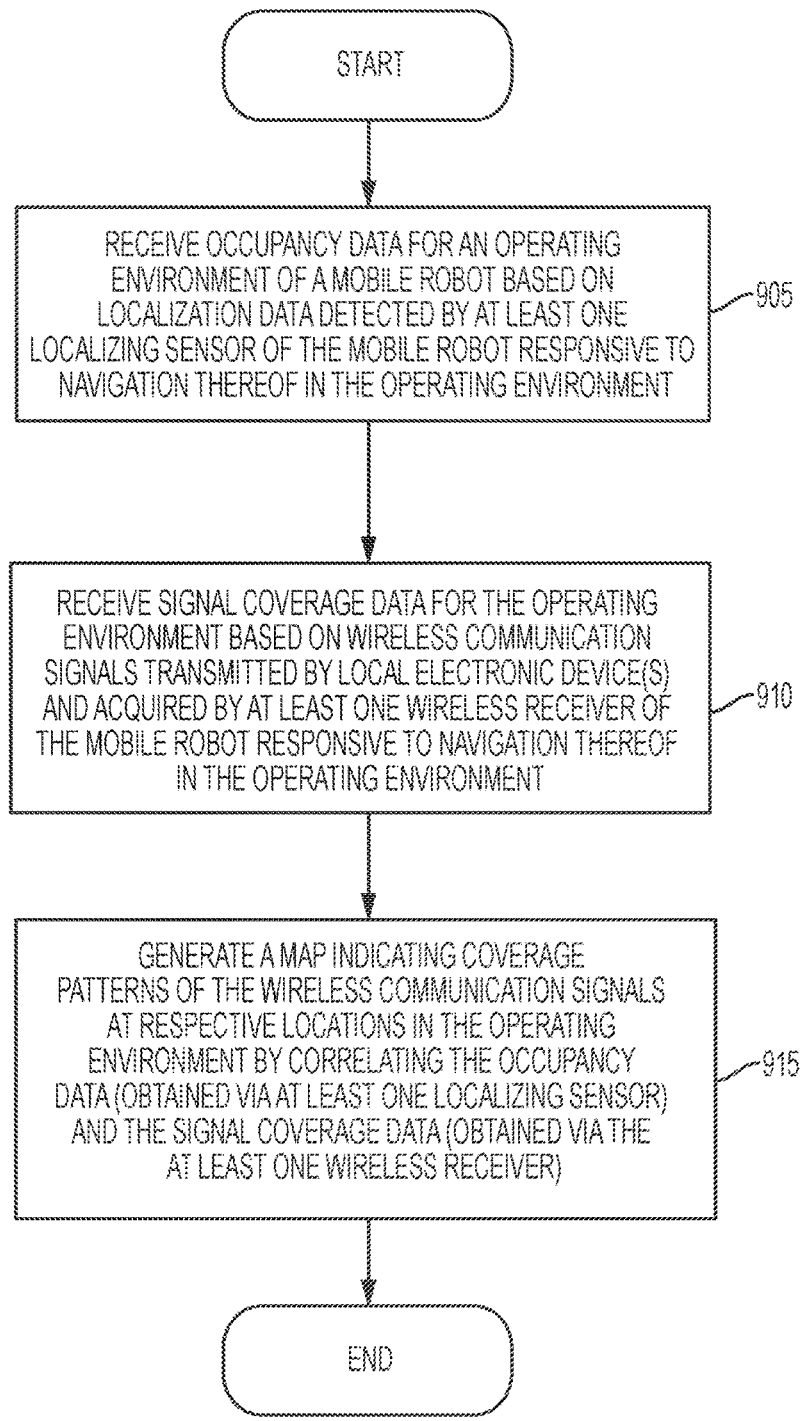
FIGS. 9-11 are flowcharts illustrating operations that may be performed by at least one processor of a computing device according to embodiments of the present disclosure.
Figure 10:
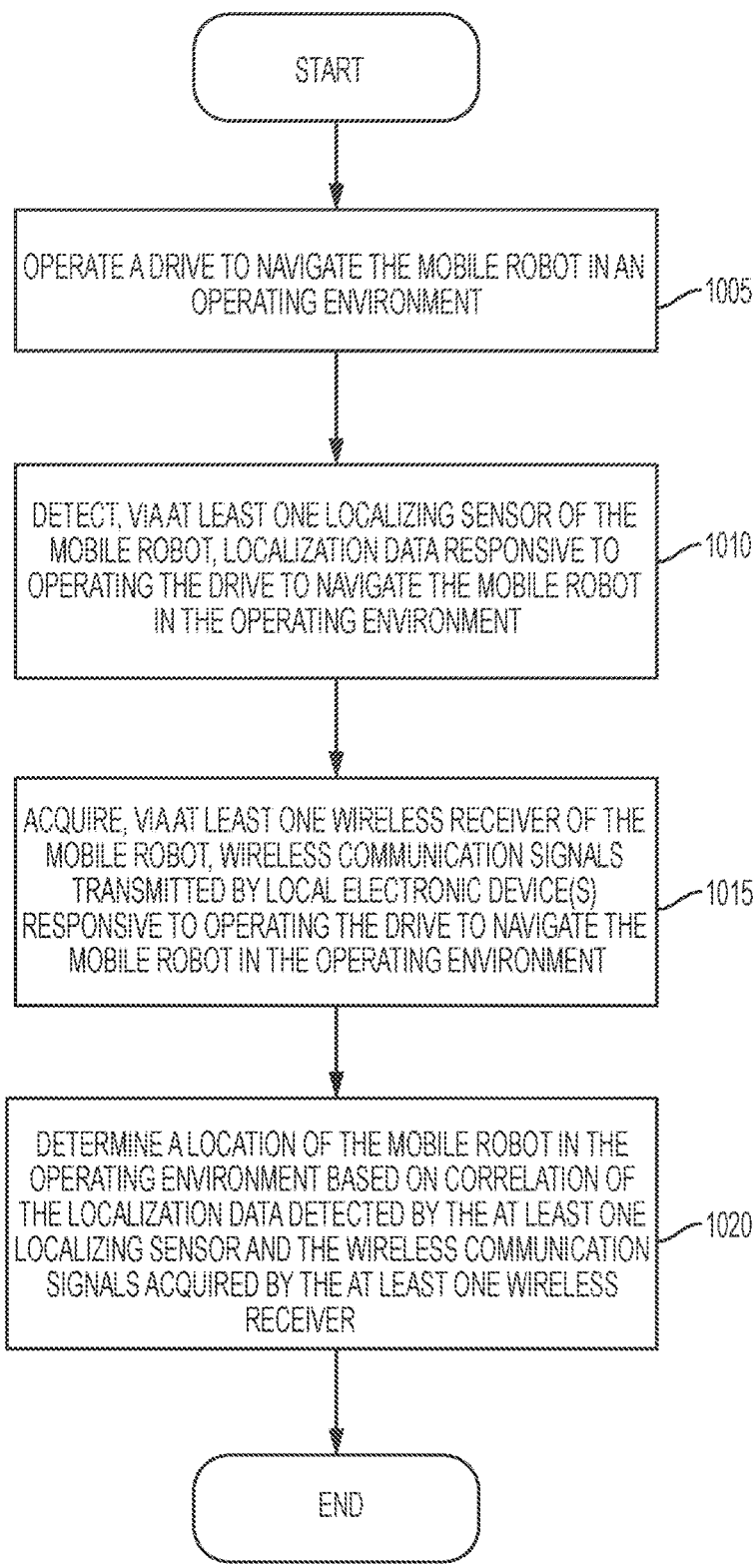
Figure 11:
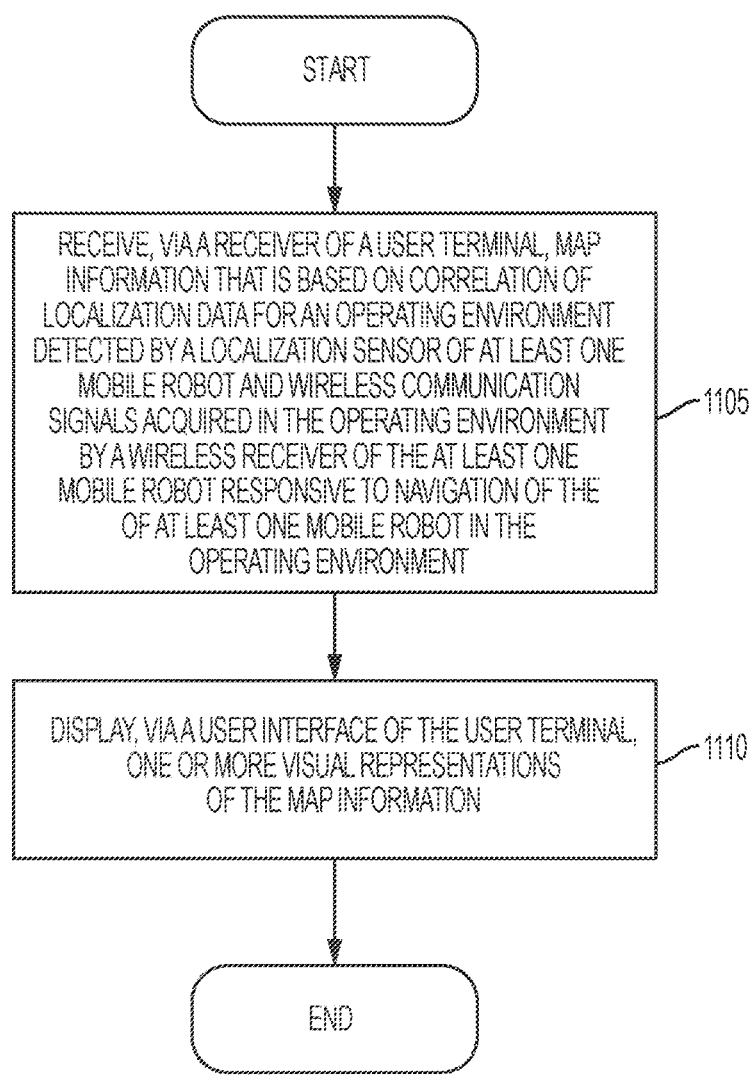

FIGS. 9-11 are flowcharts illustrating operations that may be performed by at least one processor of a computing device in accordance with wireless communication signal mapping techniques described in embodiments of the present disclosure. The operations of FIGS. 9-11 may represent executable routines or instructions stored in a non-transitory computer-readable medium, such as the memory devices 222, 320, 428 described herein, and may be executed by one or more processors, such as the processors 220, 310, and/or 427 described herein, to implement the specified routines or instructions.

In particular, the operations of FIG. 9 may be executed by one or more processors of the server 150, mobile robot 200, and/or user terminals 142, 144 of FIG. 1B. With reference to FIG. 9, occupancy data for an operating environment of a mobile robot is received at block 905 responsive to navigation of the mobile robot in the operating environment. The occupancy data is based on localization data detected by at least one localizing sensor of the mobile robot during navigation of the operating environment, for example, using VSLAM techniques. In some embodiments, the occupancy data may be based on localization data that is obtained by multiple mobile robots in the operating environment.

Signal coverage data for the operating environment is received at block 910, likewise responsive to navigation of the mobile robot in the operating environment. The signal coverage data is based on wireless communication signals acquired by at least one wireless receiver of the mobile robot, for example, by scanning one or more communication frequencies at respective locations of the operating environment. The wireless communication signals are transmitted by one or more network enabled electronic devices that are local to the operating environment, such as one or more of the connected devices 120, 122, 124, 126, 128, 142, 144, and 162 of FIG. 1B.

A map indicating coverage patterns of the wireless communication signals at respective locations in the operating environment is generated at block 915 by correlating the occupancy data (received at block 905) and the signal coverage data (received at block 910). The coverage patterns indicate respective signal characteristics (including but not limited to signal strength, signal-to-noise ratio, data throughput, and/or multipath distortion) of the wireless communication signals at the respective locations in the operating environment. Respective locations of electronic devices in the operating environment may thereby be determined based on the coverage patterns, for example, based on peaks in the signal strengths and/or changes in slope/direction of the signal strengths at the respective locations in the operating environment. The map may be updated responsive to occupancy data and/or signal coverage data obtained by the mobile robot upon one or more subsequent navigations through the environment, such that the map may define a persistent map representing a collection of received signal strengths for one or more networked devices over a predetermined period of time during which the mobile robot has navigated the operating environment.

FIG. 10 is a flowchart illustrating operations that may be executed, for example, by at least one processor of a mobile robot, such as the processor 220 of the mobile robot 200 described herein. As discussed above, the processor is coupled to a drive configured to navigate the mobile robot in an operating environment, a localizing circuit including at least one localizing sensor, a wireless communication circuit, and a memory including a computer readable storage medium that stores computer readable program code defining executable routines or instructions. The wireless communication circuit may be communicatively coupled to one or more remote servers and/or user terminals via a local or wide area network. The processor is configured to execute the routines stored in the memory to perform the operations of FIG. 10.

In particular, with reference to FIG. 10, the drive is operated at block 1005 to navigate the mobile robot to access locations within an operating environment. For example, the operating environment may include a household or rooms within the household. The drive may be operated based on a navigation routine including one or more of coverage patterns (such as boustrophedon rows), perimeter and area discovery patterns (such as wall and/or obstacle following or skirting patterns), systematic error safeguards (such as random bounce and other randomizations), and/or point-to-point or zone-to-zone trajectory sequences.

At block 1010, localization data is detected via at least one localizing sensor of the mobile robot responsive to operating the drive to navigate the mobile robot in the operating environment. The localization data may include range measurements from ranging sensors, occupancy and obstacle determinations from obstacle and proximity sensors, and feature and landmark determinations from cameras and other pattern/image/fiducial observation sensors. The localization data may be detected in a surface mapping routine to record 2-dimensional occupancy data representing locations of the operating environment and/or poses of the mobile robot thereon, for example, using VSLAM techniques.

Wireless communications signals are acquired via at least one wireless receiver of the mobile robot at block 1015 responsive to operating the drive to navigate the mobile robot in the operating environment. The wireless communication signals may be transmitted by one or more network enabled electronic devices that are local to the operating environment. The wireless communication signals may be acquired in a signal mapping routine, to record signal coverage data (including coverage patterns and respective signal characteristics) of the wireless communication signals at respective locations of the operating environment. The wireless communication signals may be acquired at the respective locations within the operating environment periodically, aperiodically, or continuously, using single-channel scanning, multi-channel scanning, and/or network monitoring.

A location of the mobile robot in the operating environment is determined at block 1020 based on correlation of the localization data detected by the localizing sensor (at block 1010) and the wireless communication signals acquired by the wireless receiver (at block 1015). For example, the identity and location of one or more of the network-enabled electronic devices in the operating environment may be determined based on the wireless communication signals received therefrom, and the location of the mobile robot may be determined relative to the location(s) of the electronic device(s). Also, changes in signal strength of the received wireless communication signals at respective locations in the operating environment (for example, as indicated by a rate of change in topology of a 3-dimensional map in which received signal strength is correlated to occupancy information from the localization data) may be further used to determine the location of the mobile robot. That is, localization of the mobile robot is performed based not only on the localization data obtained via its localizing sensors, but also based on the wireless communications obtained via its wireless receiver.

Mobile robots as described herein may be uniquely configured to map wireless signal coverage (such as Wi-Fi coverage) in a household or other operating environment, as the mobile robots already include localization circuits that independently operate to navigate the mobile robots through the environment. As such, intermittently or concurrently with execution of a surface mapping routine, the mobile robot(s) can collect multiple samples of received signal characteristics, such as received signal strength indications (RSSI) via respective wireless communication circuits in many different locations of the operating environment, which can be used with temporal and geographical averaging of data to construct accurate wireless signal fields of individual devices in the operating environment.

FIG. 11 is a flowchart illustrating operations that may be executed, for example, by at least one processor of a user terminal, such as a processor 427 of the user terminal 400 described herein. As discussed above, the processor is coupled to a receiver, a user interface, and a memory including a computer readable storage medium that stores computer readable program code defining executable routines or instructions. The receiver may be communicatively coupled with a mobile robot and/or a remote server in communication therewith, via a local or wide area network. The processor is configured to execute the routines stored in the memory to perform the operations of FIG. 11.

In particular, with reference to FIG. 11, map information that is based on correlation of localization data detected by localization sensor(s) of one or more mobile robots and wireless communication signals acquired by wireless receiver(s) of the mobile robot(s) responsive to navigation of the mobile robot(s) in an operating environment is received via a receiver of the user terminal at block 1105. The wireless communication signals may be transmitted by one or more network enabled electronic devices that are local to the operating environment. The map information may be received directly from one or more of the mobile robots, or from a remote server in communication with the mobile robot(s).

One or more visual representations of the map information are displayed via a user interface of the user terminal at block 1110. In particular, the map information may be represented in a format that maybe more meaningful to a human user or operator. For example, the visual representations displayed at block 1110 may correspond to one or more of those shown and described above with reference to FIGS. 5A, 5B, 5C, 6A, 6B, 6C, 7, 8A, and/or 8B. In particular embodiments, the visual representations may include an occupancy map indicating physical characteristics of the operating environment (including obstacles detected by the localization sensor(s) of the mobile robot(s) in the operating environment), and/or a signal coverage map indicating electrical characteristics of the operating environment (including respective signal strengths of the wireless communication signals acquired by the wireless receiver(s) of the mobile robot(s) at respective locations in the operating environment), which may be displayed in 2- or 3-dimensional representations. A respective occupancy map and/or a signal coverage map may be generated and displayed for each detected electronic device from which wireless communication signals are received in the operating environment.

For example, the signal coverage map may be displayed as a 2-dimensional representation (or 'heat map') that indicates the respective signal strengths of the wireless communication signals by displayed colors, brightness levels, and/or distances between bands or rings that vary at the respective locations in the operating environment. The signal coverage map may also be displayed as a 3-dimensional topological representation, with the X- and Y-axes corresponding to locations defined by the occupancy grid, and the Z-axis indicating wireless communication signal strength of each device at the respective locations of the occupancy grid, as well as changes in slope/direction of the signal strength between the respective locations. The varying colors, brightness levels, and/or distances between bands/rings may be used in combination with the 3-dimensional topological representation of the respective signal strengths in some embodiments.

Combinations of the 2-D occupancy grid and the 3-D signal strength topology or heat maps may also be displayed at block 1110, either correlated or side-by-side. The topological wireless communication signal strength data from multiple electronic devices in the operating environment may be further combined into a single map, thereby indicating locations of multiple devices on the same map. As such, location information for multiple network enabled devices in an operating environment may be received by a local or remote user terminal and displayed in the above or other user-friendly formats thereon.

More generally, by combining occupancy data with signal coverage data obtained by navigation of a mobile robot in an operating environment, a map may be generated to indicate physical characteristics at respective locations of the operating environment (as indicated by the localization data detected by the mobile robot at the respective locations), and electrical characteristics (including signal strength, absence of coverage, and/or signal interference) at respective locations of the operating environment of the mobile robot (as indicated by signal strengths of the wireless communication signals acquired by the mobile robot at the respective locations). As described herein, the combination of the occupancy data and the signal coverage data for the operating environment may be used to improve operation or functionality of mobile robots and/or other devices in the operating environment, as well as to present information about such mobile robots and/or other devices to a user. Such improvements may include, but are not limited to, identifying weak spots and gaps in signal intensity, determining locations/identifications of items in rooms, faster localization/re-localization of mobile robot, displaying annotated maps to a user, sharing maps with another robot/device, and/or system diagnostics based on packets received from other devices.

Example uses of combined occupancy and signal coverage data by mobile robots, servers, and/or user terminals are described below. While some examples may refer to particular wireless communication signals (such as Wi-Fi signals) transmitted by particular electronic devices (such as wireless router devices), it will be understood that these examples are not limited to any particular device or communication standard/protocol.

In some embodiments, operations for mapping device locations based on wireless signal coverage as described herein may allow for correlation or merging of occupancy maps generated from localization data obtained from multiple navigation of the same operating environment, by the same mobile robot or by multiple robots. For example, the localization data obtained by one or more mobile robots may include visual localization data detected by vision-based localizing sensors at different times of day and/or in different lighting conditions, and the map may be generated by merging respective occupancy maps that were generated from the visual localization data detected at the different times of day and/or in the different lighting conditions using the location determined for least one electronic device as an anchor point, to resolve ambiguities caused by the different lighting conditions in the visual localization data. Different maps from neighboring/geographically collocated operating environments may also be combined or 'stitched' together based on sufficient overlap in topologically-mapped fields of wireless signal strength.

In some embodiments, the correlation between the occupancy grid and the map of wireless communication signals may be transmitted to or otherwise shared with one or more other devices within the operating environment. For example, such other devices may include mobile robots that lack visual localization capabilities. These less-advanced robots may use the occupancy grid determined by a more-advanced mobile robot for self-localization. For instance, an autonomous vacuum cleaner robot, which may include a camera or other imaging sensor device, may navigate an operating environment and generate occupancy grid data for the operating environment, based on visual simultaneous localization and mapping techniques. The vacuum cleaner robot may thereby transmit the determined occupancy grid data to a cloud computing device and/or directly to another mobile robot having lesser capabilities, such as a floor mopping robot, which may be confined to floor locations. In addition, an autonomous patrolling robot having a camera mounted with a higher vantage point may further include a wireless signal sensor on or coupled to the higher vantage point, thereby allowing for reception of the wireless communication signals at different heights and generation of mapping data indicative of the signal strengths received at the different heights. In some embodiments, the higher vantage point may be provided by mechanically-actuated elements, such as a telescoping or otherwise extendible mast. As such, this patrolling robot may generate mapping data that may be unobtainable by mobile robots that are constrained to collecting at the lower height of their respective wireless sensor signals.

Asymmetries in the respective coverage patterns may be used to identify and/or differentiate maps as corresponding to respective floors at different elevations of the operating environment (for example, multiple floors in the same household and/or in a different household). For example, the use of directional antennas and 'beam steering' techniques (such as in multi-user multiple input, multiple output (MU-MIMO) implementations) may increase the asymmetry of the acquired Wi-Fi signals, reducing position ambiguity. Devices with an omnidirectional (hemispherical) radiation pattern may be sensed on the floor above the vertical extension of the hemisphere and correlated between maps of the floors by reference to the unique network address it transmits (for example, a MAC address). Adding devices with deliberately non-omnidirectional radiation patterns, or a pattern that changes predictably over time, can guarantee the 'fingerprint' represented by a combination of measured RSSI strengths yields a unique location. Similar techniques can be used by a mobile robot, or located in its dock, including at least one directional antenna to correlate floors (for example, by transmitting a vertical beam upwards from the lowest point, towards the upper floor(s). The robot may also determine respective heights or horizontal positions of detected electronic devices (for example, based on two antenna patterns one sensitive high and one horizontal).

In addition, some devices may have an inherently asymmetric RF radiation pattern, particularly when observed from floor level. For example, a thermostat device including a metal ring on its face may transmit with low signal strength directly under and just in front of the device, whereas the signal strength on the opposite side of the wall on which it is mounted is may be significantly higher (as its internal construction and mounting bracket may be plastic). Responsive to identifying the specific manufacturer and model of device as described herein, the signal coverage data may be corrected for that specific model's RF radiation pattern, and thus, may be used to determine the position of the device with greater accuracy. For example, the position of the thermostat device on a particular side of a wall may be determined.

In some embodiments, correlating signal coverage of wireless communication signals with an occupancy grid independently determined by the mobile robot using VSLAM techniques may improve speed and/or accuracy of localization by the mobile robot. For example, if the mobile robot is "kidnapped" (i.e., picked-up and repositioned or moved to a new location within the operating environment), the mobile robot may detect such repositioning and determine its new location in the operating environment based on a comparison of the wireless communication signals detected at its new location with those of the map of wireless communication signals previously obtained. In particular, based on the received signal strength at the new location, the slope of the received signal strength, and/or the direction in which the of the slope of the signal strength changes at the new location (for example, as indicated by a rate of change in topology of a 3-dimensional map in which the signal coverage is correlated to the occupancy grid), the mobile robot may more rapidly determine its new location and/or its current pose at the new location. The angle, direction, and/or rate at which the slope of the signal strength changes relative to a peak signal strength may also aid in determining the current pose of the mobile robot. The speed and/or accuracy of such localization may be enhanced when performed in combination with visual localization techniques, such as camera-based recognition of the environment. That is, in a topological representation of the received signal strength correlated to an occupancy grid for the operating environment, a particular signal strength and a rate of change in slope thereof in one or more directions may be used along with the pose of the mobile robot to determine its new location in the operating environment. The relative improvement in speed and/or accuracy of re-localization can be demonstrated by selectively disabling either the localization sensor(s) or the wireless signal reception of the mobile robot. In addition, the mobile robot may be configured to resolve uncertainties with respect to the occupancy grid and/or its location therein based on the unique wireless signatures of respective fixed-location devices indicated by the wireless communication signal map or maps at the respective locations of the devices.

In some embodiments, the drive may be operated to navigate the mobile robot directly to the location of an electronic device whose location in the operating environment was previously determined, for example, responsive to activation of a sensor and/or alarm at the location of the device, as a "first responder." Upon arrival at the location of the electronic device, live audio and/or visual information may be recorded by the mobile robot and/or transmitted to a remote device, such as a user terminal 142, 144 of FIG. 1B.

In some embodiments, information about the operating environment determined from the coverage patterns of the acquired wireless communications signals may be transmitted to one or more other devices that are operating within the environment, allowing for shareable diagnostics. For example, the transmission coverage and location of each detected device in the operating environment may indicate a network configuration in which two connected devices may each be able to communicate with a particular access point, but may not be able to 'hear' (i.e., may be unaware of) the transmissions of the other. In some instances, both devices may attempt to transmit simultaneously on the same channel or frequency, such that the access point may not receive valid communications from either device (known as the 'hidden node' problem). Some embodiments described herein may use the correlated data to detect which devices cannot 'hear' which others, even though they may be in range of the same access point (which typically has higher transmit power and more sensitive reception, because of external antennas), and may transmit instructions to one or more of the devices to alter or assign different channels or communication frequencies thereto, to avoid potential or actual interference. In addition, one or more detected devices may be informed of the existence of one or more other detected devices that are outside each other's communication range, for example, devices having wireless connections to different routers in the operating environment. Operation of the mobile robot in accordance with embodiments of the present disclosure may thus bridge gaps between devices in the operating environment that may otherwise be unaware of one another.

In some embodiments, information about the operating environment determined from the coverage patterns of the acquired wireless communications signals may be stored and provided to devices that are subsequently added to operating environment. For example, a device that is newly-added to the operating environment may communicate its existence to one of the access points within the environment, and previously stored information about the operating environment may be downloaded or otherwise shared with the newly-added device to aid setup operations for the newly-added device. That is, previous navigation of the operating environment by the mobile robot may allow a subsequently-added device to execute automatic setup operations within the operating environment.

In some embodiments, multiple communication protocols may be monitored by the wireless receiver of the mobile robot, for example, using a multi-protocol scan, so as to detect multiple electronic devices within the environment that may be configured to communicate using different communication protocols. Information about the operating environment and/or the multiple electronic devices operating therein may thus be formatted and shared with one or more of the detected devices via their respective communication standards. As such, devices that are incapable of communication with one another may be made aware of the existence and/or operation of one another within the operating environment.

In some embodiments, the map of wireless communication signals may indicate signal strength information (and corresponding location within the operating environment) for a particular device, such as a lost user device. For example, a user who has misplaced a smart phone within the operating environment may generate, via another user terminal (such as a laptop or desktop computer or tablet computer), a request for a last known location of the lost user device. In response, the user terminal may retrieve and display an image of the location in the operating environment corresponding to a peak signal strength of the most recently recorded wireless communications signals from the lost user device, a plan view map of the operating environment in which the location is marked, and/or an audible description of the location. As such, the map of wireless communication signals may be used to locate the lost device, even if the lost device is without power.

In some embodiments, based on the acquired wireless communication signals, a device manufacturer may be identified from a MAC address, and a model/type of the device may be identified from multi-protocol scan or other network probing/monitoring. This may enable identification and differentiation between stationary devices with fixed locations (such as thermostats or wireless access points), versus and mobile devices (such as smartphones or tablets). Additionally or alternatively, the wireless signals broadcast from these devices may include customer definitions indicated by a registered address. The mobile robot and/or a cloud computing device associated therewith may transmit or otherwise share such identification information with a user terminal, for display via its user interface.

In some embodiments, the Wi-Fi coverage data for a household, as indicated by the acquired Wi-Fi signal strengths at respective locations, can be used to inform a user of improved positioning or placement for the corresponding electronic devices in the household. In particular, for a Wi-Fi access point, the Wi-Fi signal strength data can indicate which areas of the household have weak or no Wi-Fi signal coverage from the access point. As such, based on the signal strength data indicated by the map, one or more suggestions regarding placement of the Wi-Fi access point may be transmitted to the remote user device to improve the Wi-Fi signal coverage. Likewise, suggestions to add one or more Wi-Fi repeaters to cover areas having weak or no Wi-Fi signal coverage (including suggestions for placement of the repeater(s)) may also be transmitted to the remote user device, in order to boost the Wi-Fi signal coverage in those areas. In addition, responsive to detecting signal interference between multiple devices and the operating environment, a mobile robot and/or a cloud computing device in communication there with may generate and transmit directions or recommendations regarding spatial orientation or placement of the devices that may reduce and/or resolve the signal interference.

Figure 12B:
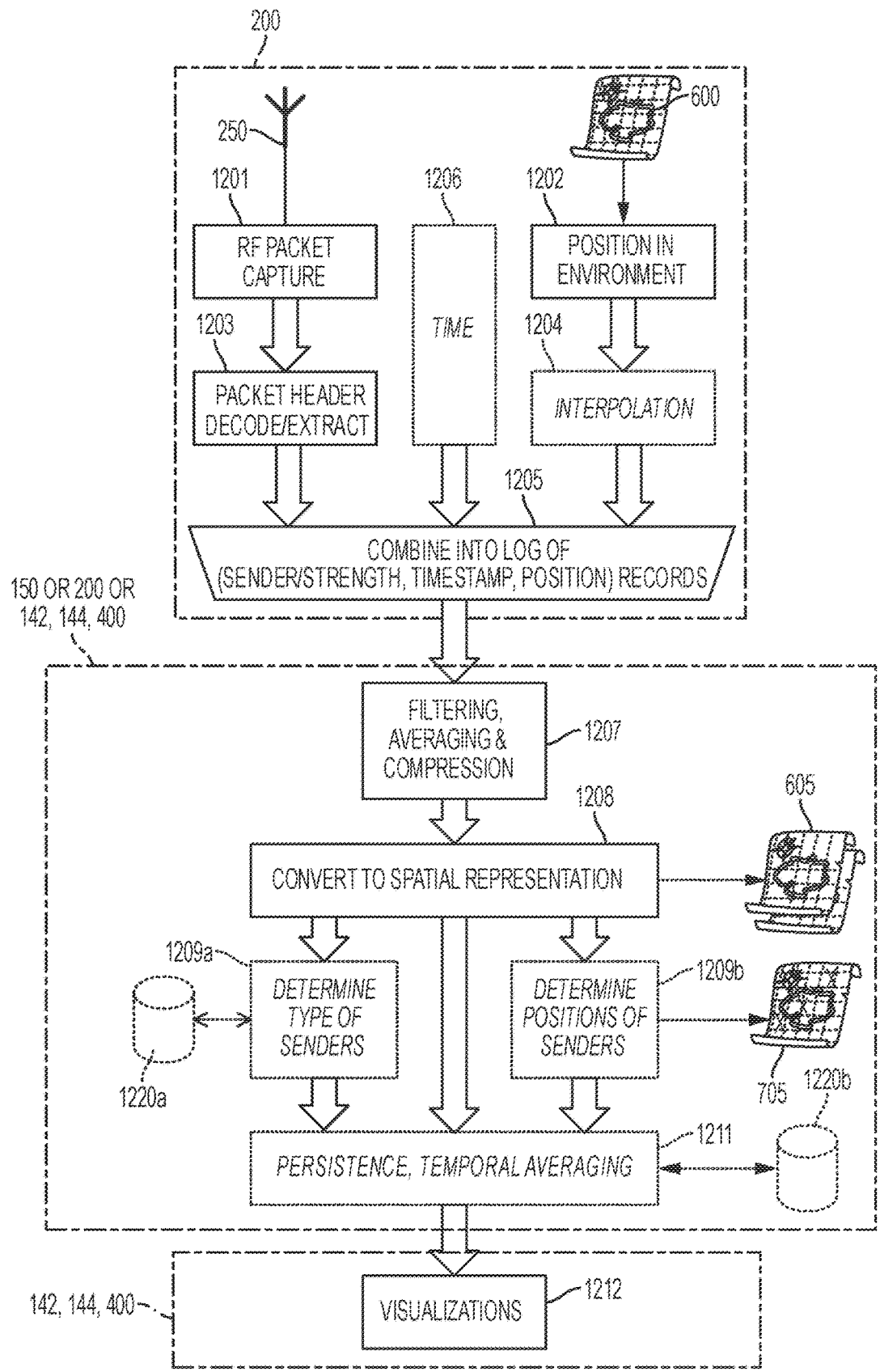
FIGS. 12A and 12B are diagrams illustrating a system of devices and related operations, respectively, according to embodiments of the present disclosure.
Figure 12A:
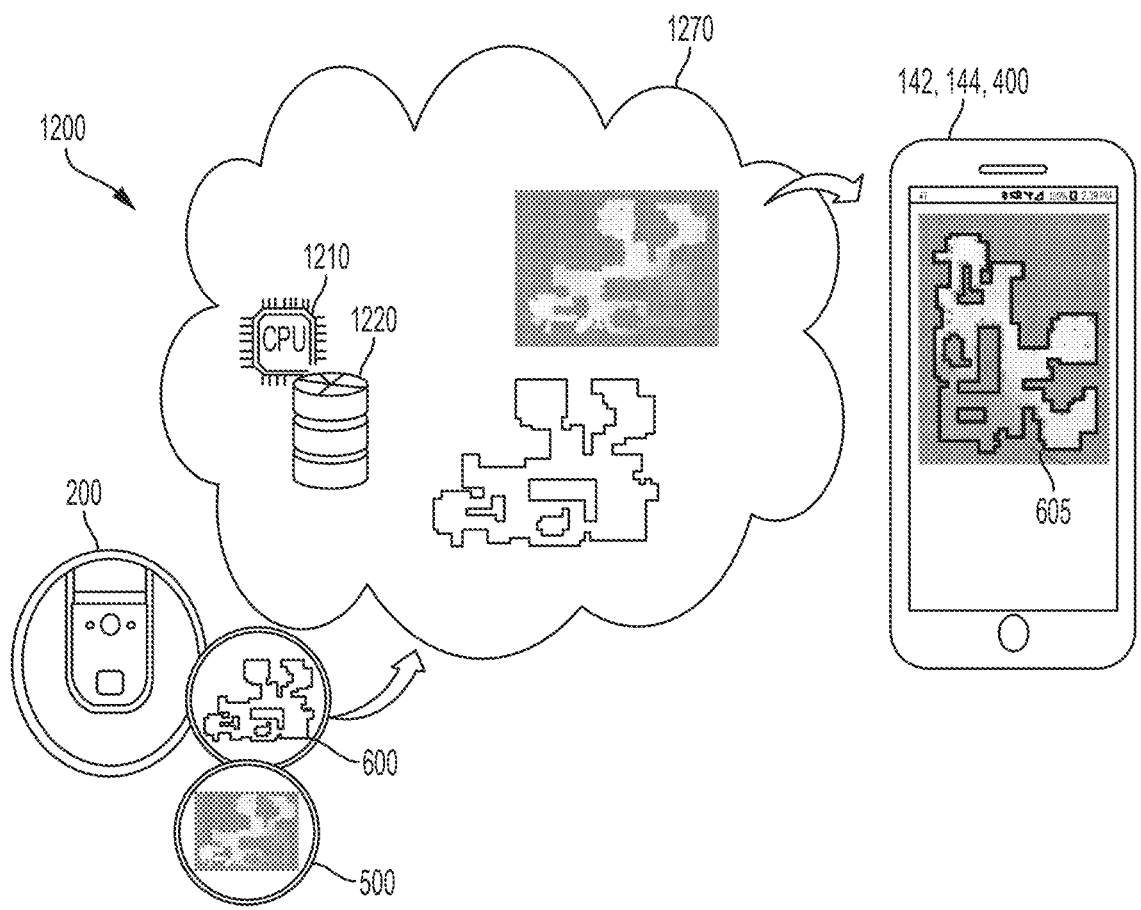

FIG. 12A is a diagram illustrating a system of devices for combining sensor-based localization and wireless signal mapping according to some embodiments of the present disclosure. The system 1200 may include a mobile robot 200 that may obtain signal coverage data 500 and occupancy data 600 for an operating environment as described herein. The signal coverage data 500 and occupancy data 600 may be transmitted to a cloud computing device and/or system 1270. In some embodiments, the cloud computing device and/or system 1270 may include the remote management server(s) 150 described herein. The cloud computing device and/or system 1270 may include a processor 1210 and user data store 1220. The user data store 1220 may store the signal coverage data 500, the occupancy data 600, and/or other data associated therewith (for example, the acquired wireless communication signals and/or the detected localization data). While some embodiments provide that the mobile robot 200 performs the correlation of the signal coverage data 500 and occupancy data 600, in some embodiments the correlation may be performed by the cloud computing device and/or system 1270.

In some embodiments, the cloud computing device and/or system 1270 may provide a communication channel between the mobile robot 200 and a user device 142, 144, 400, such that the user device 142, 144, 400 may be operative to receive messages and/or data from the robot 200 and/or the cloud computing device and/or system 1270. For example, the user device 142, 144, 400 may display one or more visual representations 605 of the signal coverage data 500, the occupancy data 600, and/or data based on correlation thereof, and may receive user inputs that allow a user to edit or modify the displayed data.

FIG. 12B is a diagram illustrating cooperative operation of devices for combining sensor-based localization and wireless signal mapping according to some embodiments of the present disclosure in greater detail. Blocks illustrated with dashed lines indicate operations that may be optionally performed in the embodiment of FIG. 12B.

As shown in FIG. 12B, a mobile robot 200 acquires wireless communication signals during navigation of an operating environment via RF packet capture using a wireless receiver 250 at block 1201. The mobile robot 200 also determines its location or position in the operating environment based on occupancy data 600 at block 1202, and in some embodiments further based on interpolation at block 1204 (for example, if position is not continuously reported). The occupancy data 600 may be based on localization data concurrently or previously obtained by the mobile robot 200 during navigation of the operating environment, for example, via one or more of the localization sensors.

Based on the RF packet capture at block 1201, the mobile robot 200 performs packet header decoding/extraction at block 1203 to determine, for example, a unique network address and/or received signal strength corresponding to one or more of the senders of the received packets. For example, the senders of the received packets may refer to the connected devices from which the packets were transmitted. Additional information, including but not limited to signal-to-noise ratio, data throughput, and/or multipath distortion, may also be determined from the received packets. The information determined from the received packets may be collectively referred to herein as signal coverage data.

The mobile robot 200 thereby combines the signal coverage data determined at blocks 1201 and 1203 with the occupancy data and positioning determined at block 1202 (and optionally 1204) into a log of records at block 1205. Optionally, time data associated with the packet capture and/or position determination may also be determined at block 1206 and recorded in the log (for example, as timestamps) at block 1205, for example, to provide additional data points for filtering and/or other correlation operations.

The signal coverage data, occupancy data, positioning, and (in some embodiments) associated timestamp data is filtered, averaged, and/or compressed at block 1207, and is converted to a spatial representation (illustrated as a map 605) at block 1208. The spatial representation 605 may indicate signal characteristics at respective positions in the operating environment based on the correlation of the signal coverage data and occupancy data at block 1207. The device type (for example, stationary/mobile, manufacturer, model, etc.) of the senders may be determined at block 1209a, and may be stored in a database 1220a. The respective position of the senders in the operating environment may also be determined at block 1209b and represented in a map 705. Persistence and temporal averaging may also be performed at block 1211 based on the determined type(s) and/or position(s) of the senders, the results of which may be stored in a database 1220b. The correlation operations 1207, 1208, 1209a, 1209b, and/or 1211 may be performed by a remote server 150 that is communicatively coupled to the mobile robot to receive the signal coverage, occupancy, and positioning data therefrom in some embodiments. However, it will be understood that one or more of the correlation operations 1207, 1208, 1209a, 1209b, and/or 1211 may be performed by the mobile robot 200 itself and/or by one or more other computing devices that may be communicatively coupled to the mobile robot 200, including the remote server 150 and/or a user terminal 142, 444, 400.

The user terminal 142, 444, 400 receives the data resulting from correlation of the signal coverage data and occupancy data at blocks 1207, 1208, 1209a, 1209b, and/or 1211, and displays one or more visual representations of the data at block 1212. Examples of data that may be displayed via the user terminal 142, 144, 400 are shown in the user interfaces of FIGS. 13-17.

Figure 13:
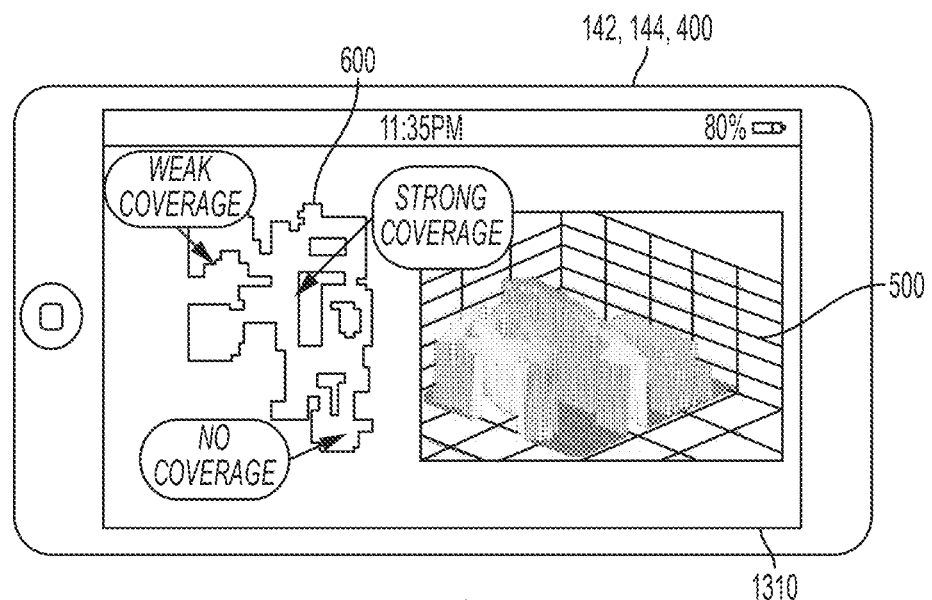
FIGS. 13-17 are plan views illustrating a user interface of a user terminal and related operations according to embodiments of the present disclosure.

With reference to the user interface 1310 of FIG. 13, the 2-D occupancy grid 600 is shown side-by side with a 3-D topological representation of the signal coverage data 500. Indications of locations in the operating environment where signal coverage is strong, weak, or absent are indicated by arrows ("strong coverage," "weak coverage," or "no coverage") on the occupancy grid 600, and are also visible from changes in slope in the 3-D topological representation of the signal coverage data 500.

Figure 14:
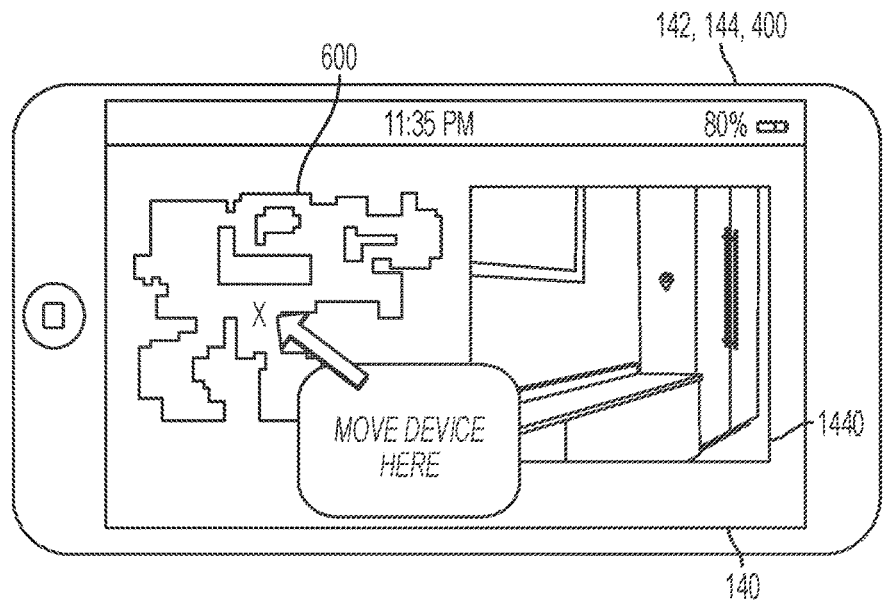

With reference to the user interface 1410 of FIG. 14, the 2-D occupancy grid 600 is shown side-by-side with a photograph 1440 of a location "X" in the operating environment. The location or area "X" and the corresponding photograph 1440 indicate a suggested position in the operating environment for repositioning of a wireless router ("Move device here"), for example, to improve signal coverage based on the wireless communication signals acquired by the mobile robot in the operating environment.

Figure 15:
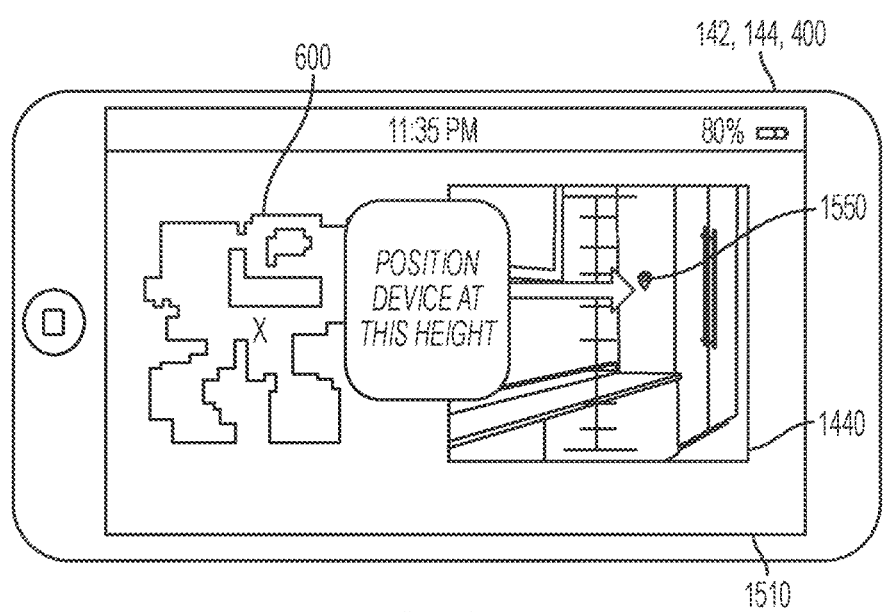

With reference to the user interface 1510 of FIG. 15, the 2-D occupancy grid 600 is shown side-by-side with the photograph 1440 of the location or area "X" indicating the suggested position in the operating environment for repositioning of a wireless router to improve signal coverage, along with an indication 1550 showing a recommended height for placement of the wireless router ("Position device at this height"), for example, to avoid interference with one or more other connected devices in the operating environment based on the wireless communication signals acquired by the mobile robot in the operating environment.

Figure 16:
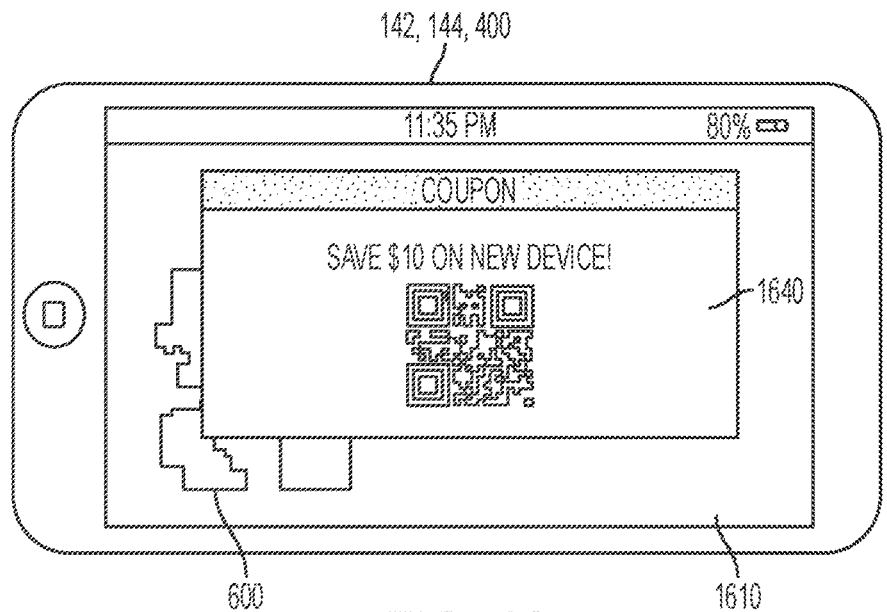

With reference to the user interface 1610 of FIG. 16, an incentive 1640 for purchase of a new wireless router or range extender is displayed over the 2-D occupancy grid 600. The incentive 1640 may be displayed based on poor signal coverage characteristics for an existing wireless router as indicated by the wireless communication signals acquired by the mobile robot in the operating environment.

Figure 17:
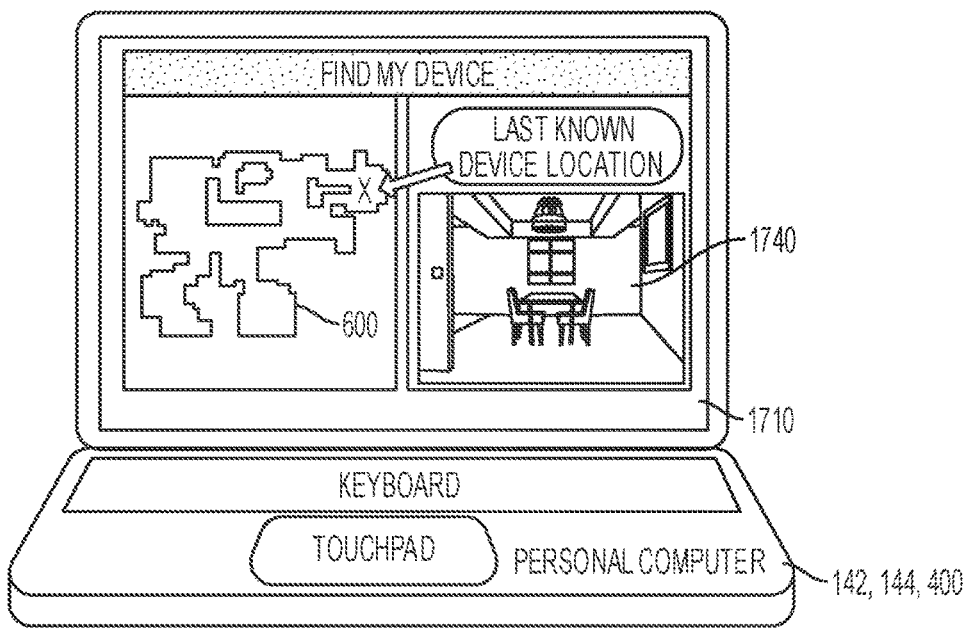

With reference to the user interface 1710 of FIG. 17, the 2-D occupancy grid 600 is shown side-by-side with a photograph 1740 of a location "X" in the operating environment. The location "X" and the corresponding photograph 1740 indicate a most recent location of a mobile electronic device in the operating environment from which the wireless communication signals were received ("Last known device location") based on the wireless communication signals acquired by the mobile robot. The view shown in photograph 1740 is aimed in the direction of the last peak emanation of the signals from the mobile electronic device. An audible description of the location "X" represented by the photograph 1740 (for example, "your phone was last detected in the dining room") may additionally or alternatively be provided via the user interface 1710.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a hard disk drive, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document; a computer readable storage medium may be any non-transitory medium that can contain, or store a program for use by or in connection with an instruction execution system, apparatus, or device.

A computer readable signal medium may include a propagated data signal with computer readable information embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer readable information embodied on a computer readable signal medium (for example, as program code) may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. The program code may execute entirely on a user terminal, a mobile robot, or a remote server described herein, or partly on one or more of each. In the latter scenario, the remote server may be connected to the user terminal and/or to the mobile robot through any type of network, including a local area network (LAN) or a wide area network (WAN), or the connection may be made to an external computer (for example, through the Internet using an Internet Service Provider) and/or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions The foregoing is illustrative of embodiments of the present disclosure and is not to be construed as limiting thereof. Although a few example embodiments have been described, those skilled in the art will readily appreciate that many modifications are possible in the example embodiments without materially departing from the teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

What is claimed is:

1. A user terminal, comprising:
a receiver;
a user interface;
a processor coupled to the receiver and the user interface; and
a memory coupled to the processor, the memory comprising a non-transitory computer-readable storage medium storing computer-readable program code therein that is executable by the processor to perform operations comprising:
receiving, via the receiver of the user terminal, localization data detected by a localization sensor of at least one mobile robot in an operating environment thereof and signal coverage data of wireless communication signals transmitted by at least one electronic device in the operating environment and acquired by a wireless receiver of the at least one mobile robot in the operating environment responsive to navigation of the at least one mobile robot in the operating environment;
correlating the localization data detected by the localization sensor with the signal coverage data of the wireless communication signals, and generating a composite map based on the correlation; and
displaying, via the user interface of the user terminal, one or more visual representations of map information including the composite map, the one or more visual representations comprising an occupancy map that identifies the at least one electronic device as mobile or stationary.

2. The user terminal of claim 1, wherein the one or more visual representations comprise:
a signal coverage map indicating electrical characteristics of the operating environment including respective signal strengths of the wireless communication signals acquired by the wireless receiver of the at least one mobile robot at respective locations in the operating environment.

3. The user terminal of claim 2, wherein the signal coverage map comprises a two-dimensional representation indicating the respective signal strengths of the wireless communication signals by colors or brightness levels that vary at the respective locations in the operating environment, or a three-dimensional topological representation indicating the respective signal strengths of the wireless communication signals at the respective locations in the operating environment relative to an axis and changes in slope of the respective signal strengths between the respective locations.

4. The user terminal of claim 1, wherein the operations further comprise:
displaying, via the user interface of the user terminal, an indication of one or more suggested positions in the operating environment for repositioning of the at least one electronic device, based on the wireless communication signals acquired by the wireless receiver of the at least one mobile robot.

5. The user terminal of claim 1, wherein the operations further comprise:
displaying, via the user interface of the user terminal, an indication of one or more suggested frequencies or channels for communication by the at least one electronic device, based on signal interference indicated by the wireless communication signals acquired by the wireless receiver of the at least one mobile robot.

6. The user terminal of claim 1, wherein the one or more visual representations of the map information indicates areas in the operating environment in which signal coverage by the wireless communication signals is weak or absent, and wherein the operations further comprise:
displaying, via the user interface, a suggestion for improvement of the signal coverage.

7. The user terminal of claim 1, wherein correlating the localization data with the signal coverage data includes filtering a combination of the localization data and the signal coverage data and converting the filtered data into a spatial representation indicating signal characteristics at respective positions in the operating environment.

8. The user terminal of claim 1, wherein the occupancy map further indicates an identity comprising type, manufacturer, or model of the at least one electronic device.

9. A user terminal, comprising:
a receiver;
a user interface;
a processor coupled to the receiver and the user interface; and
a memory coupled to the processor, the memory comprising a non-transitory computer-readable storage medium storing computer-readable program code therein that is executable by the processor to perform operations comprising:
receiving, via the receiver of the user terminal, localization data detected by a localization sensor of at least one mobile robot in an operating environment thereof and signal coverage data of wireless communication signals transmitted by at least one electronic device in the operating environment and acquired by a wireless receiver of the at least one mobile robot in the operating environment responsive to navigation of the at least one mobile robot in the operating environment;
correlating the localization data detected by the localization sensor with the signal coverage data of the wireless communication signals, and generating a composite map based on the correlation;
displaying, via the user interface of the user terminal, one or more visual representations of map information including the composite map, the one or more visual representations comprising an occupancy map indicating a location of the at least one electronic device in the operating environment and a graphical representation of the wireless communication signals emitted from the at least one electronic device; and
receiving an indication of a current location of the at least one mobile robot in the operating environment, wherein the graphical representation of the wireless communication signals emitted from the at least one electronic device is varied based on a proximity of the current location of the at least one mobile robot to the location of the at least one electronic device.

10. The user terminal of claim 9, wherein the graphical representation of the wireless communication signals is varied in color, brightness level, or distance between displayed bands or rings.

11. The user terminal of claim 9, wherein the location of the at least one electronic device in the operating environment is a most recent location from which the wireless communication signals were received from the at least one electronic device, and wherein the operations further comprise:
providing, via the user interface of the user terminal, an audio or visual indication of the most recent location.

12. A method of operating a user terminal, comprising:
performing, by a processor of the user terminal, operations comprising:
receiving, via a receiver of the user terminal, information indicating an absence of wireless router signal coverage in respective locations of an operating environment of a mobile robot based on wireless communication signals transmitted by at least one electronic device local to the operating environment and acquired by a wireless receiver of the mobile robot responsive to navigation in the operating environment; and
displaying, via a user interface of the user terminal, a message prompting a user to purchase a wireless router device based on the information indicating the absence of the wireless router signal coverage.

13. A method of operating a user terminal, the method comprising:
performing, by a processor of the user terminal, operations comprising:
receiving, via a receiver of the user terminal, localization data detected by a localization sensor of at least one mobile robot in an operating environment thereof and signal coverage data of wireless communication signals transmitted by at least one electronic device in the operating environment and acquired by a wireless receiver of the at least one mobile robot in the operating environment responsive to navigation of the at least one mobile robot in the operating environment;
correlating the localization data detected by the localization sensor with the signal coverage data of the wireless communication signals, and generating a composite map based on the correlation; and
displaying, via a user interface of the user terminal, one or more visual representations of map information including the composite map, the one or more visual representations comprising an occupancy map that identifies the at least one electronic device as mobile or stationary.

14. The method of claim 13, wherein the occupancy map further indicates an identity comprising type, manufacturer, or model of the at least one electronic device.

15. The method of claim 13, wherein the occupancy map further indicates a location of the at least one electronic device in the operating environment and a graphical representation of the wireless communication signals emitted from the at least one electronic device.

16. The method of claim 13, wherein the one or more visual representations comprise:
a signal coverage map indicating electrical characteristics of the operating environment including respective signal strengths of the wireless communication signals acquired by the wireless receiver of the at least one mobile robot at respective locations in the operating environment.

17. The method of claim 16, wherein the signal coverage map comprises a two-dimensional representation indicating the respective signal strengths of the wireless communication signals by colors or brightness levels that vary at the respective locations in the operating environment, or a three-dimensional topological representation indicating the respective signal strengths of the wireless communication signals at the respective locations in the operating environment relative to an axis and changes in slope of the respective signal strengths between the respective locations.

18. The method of claim 13, wherein the operations further comprise:
displaying, via the user interface of the user terminal, an indication of one or more suggested positions in the operating environment for repositioning of the at least one electronic device, based on the wireless communication signals acquired by the wireless receiver of the at least one mobile robot.

19. The method of claim 13, wherein the operations further comprise:
displaying, via the user interface of the user terminal, an indication of one or more suggested frequencies or channels for communication by the at least one electronic device, based on signal interference indicated by the wireless communication signals acquired by the wireless receiver of the at least one mobile robot.

20. The method of claim 13, wherein the one or more visual representations of the map information indicates areas in the operating environment in which signal coverage by the wireless communication signals is weak or absent, and wherein the operations further comprise:

displaying, via the user interface, a suggestion for repositioning of a wireless router to improve signal coverage, or a message prompting a user to purchase a wireless router.

* * * * *